US012784217B2

(12) United States Patent
Tison et al.

(10) Patent No.: US 12,784,217 B2
(45) Date of Patent: Nov. 3, 2026

(54) METHOD AND SYSTEM FOR AUTOMATED ANALYSIS OF CORONARY ANGIOGRAMS

(71) Applicant: The Regents of the University of California, Oakland, CA (US)

(72) Inventors: Geoffrey H. Tison, Oakland, CA (US); Robert Avram, Mont-Royal (CA); Jeffrey E. Olgin, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 245 days.

(21) Appl. No.: 18/568,693

(22) PCT Filed: Jun. 8, 2022

(86) PCT No.: PCT/US2022/072817
§ 371 (c)(1),
(2) Date: Dec. 8, 2023

(87) PCT Pub. No.: WO2022/261641
PCT Pub. Date: Dec. 15, 2022

(65) Prior Publication Data

US 2024/0273723 A1 Aug. 15, 2024

Related U.S. Application Data

(60) Provisional application No. 63/208,406, filed on Jun. 8, 2021.

(51) Int. Cl.
*G06K 9/00* (2022.01)
*G06T 7/00* (2017.01)

(52) U.S. Cl.
CPC .. *G06T 7/0014* (2013.01); *G06T 2207/10132* (2013.01); *G06T 2207/20081* (2013.01);
(Continued)

(58) Field of Classification Search
CPC ......... G06T 7/0014; G06T 2207/10132; G06T 2207/20081; G06T 2207/20132;
(Continued)

(56) References Cited

U.S. PATENT DOCUMENTS 12,118,033 B2 10/2024 Arnaout
2003/0142868 A1 7/2003 Tannenbaum et al.
(Continued)

FOREIGN PATENT DOCUMENTS

CA 3021697 A1 10/2017
EP 3853770 A1 7/2021
(Continued)

OTHER PUBLICATIONS

Schonenberger et al., "Kidney Injury after Intravenous versus Intra-arterial Contrast Agent in Patients Suspected of Having Coronary Artery Disease: A Randomized Trial", Radiology, vol. 292, No. 3, Jul. 2, 2019, pp. 664-672, doi: 10.1148/radiol.2019182220.
(Continued)

*Primary Examiner* — Gregory A Morse
*Assistant Examiner* — Owais I Memon
(74) *Attorney, Agent, or Firm* — KPPB LLP

(57) ABSTRACT

Disclosed herein are methods and systems for angiography interpretation. In one particular embodiment a method includes: classifying the primary anatomic structure of one or more angiogram images of a first patient; classifying the projection angle of the one or more angiogram images of the first patient; labeling stenoses within the one or more angiogram images of the first patient classified as including a left or right coronary artery; producing one or more angiogram images of a second patient with corresponding estimated stenoses of the second patient to produce training data; training a machine learning model with the training data; estimating the arterial stenoses severity of the first
(Continued)

patient by running the machine learning model on the filtered and labeled one or more angiogram images of the first patient, wherein the machine learning model is only run on angiogram images previously labeled as including stenoses.

15 Claims, 10 Drawing Sheets

(52) U.S. Cl.
CPC ............... *G06T 2207/20132* (2013.01); *G06T 2207/30048* (2013.01); *G06T 2207/30101* (2013.01); *G06T 2210/12* (2013.01)

(58) Field of Classification Search
CPC . G06T 2207/30048; G06T 2207/30101; G06T 2210/12; A61B 6/487; A61B 6/507; A61B 6/5211; A61B 8/065; A61B 8/0891; A61B 8/5215; A61B 6/504; A61B 5/026; G01R 33/5635
See application file for complete search history.

(56) References Cited

U.S. PATENT DOCUMENTS

| | | | | |
|---|---|---|---|---|
| 2004/0153128 | A1 | 8/2004 | Suresh et al. | |
| 2004/0176679 | A1 | 9/2004 | Murphy et al. | |
| 2009/0034808 | A1 | 2/2009 | Zhou et al. | |
| 2010/0172567 | A1 | 7/2010 | Prokoski | |
| 2012/0092334 | A1 | 4/2012 | Yoo | |
| 2012/0178070 | A1 | 7/2012 | Wiegand et al. | |
| 2013/0121571 | A1 | 5/2013 | Gokturk et al. | |
| 2013/0216110 | A1* | 8/2013 | Zheng | G06T 7/0012 382/128 |
| 2014/0050384 | A1 | 2/2014 | Schmidt et al. | |
| 2014/0126798 | A1 | 5/2014 | Hundley et al. | |
| 2015/0086947 | A1 | 3/2015 | Schweid et al. | |
| 2016/0210435 | A1 | 7/2016 | Neumann et al. | |
| 2017/0148158 | A1 | 5/2017 | Najarian et al. | |
| 2018/0137622 | A1 | 5/2018 | Hiltl | |
| 2019/0231316 | A1* | 8/2019 | Sutton | A61B 8/463 |
| 2019/0236779 | A1 | 8/2019 | Hattori et al. | |
| 2020/0372674 | A1* | 11/2020 | Rongen | A61B 6/486 |
| 2022/0012875 | A1 | 1/2022 | Arnaout | |
| 2024/0130702 | A1* | 4/2024 | Flack | A61B 6/504 |
| 2026/0119573 | A1 | 4/2026 | Arnaout | |

FOREIGN PATENT DOCUMENTS

| | | | |
|---|---|---|---|
| KR | 101287382 | B1 | 7/2013 |
| WO | 2018084071 | A1 | 5/2018 |
| WO | 2018187622 | A1 | 10/2018 |
| WO | 2020061218 | A1 | 3/2020 |
| WO | 2022261641 | A1 | 12/2022 |

OTHER PUBLICATIONS

Sekar et al., "Diagnosis of congenital heart disease in an era of universal prenatal ultrasound screening in southwest Ohio", Cardiology in the Young, vol. 25, No. 1, 2015, pp. 35-41, doi: 10.1017/S1047951113001467.
Selvaraju et al., "Grad-CAM: Visual Explanations from Deep Networks via Gradient-Based Localization", International Journal of Computer Vision, vol. 128, Oct. 11, 2019, pp. 336-359, doi: 10.1007/s11263-019-01228-7.
Shah et al., "Comparison of visual assessment of coronary stenosis with independent quantitative coronary angiography: Findings from the Prospective Multicenter Imaging Study for Evaluation of Chest Pain (PROMISE) trial", American Heart Journal, vol. 184, Feb. 2017, pp. 1-9, doi: 10.1016/j.ahj.2016.10.014.
Sharir et al., "An Image is Worth 16x16 Words, What is a Video Worth?", arXiv:2103.13915v2, May 27, 2021, 11 pgs.
Sianos et al., "The SYNTAX Score: an angiographic tool grading the complexity of coronary artery disease", EuroIntervention, vol. 1, No. 2, Aug. 20, 2005, pp. 219-227.
Sirnes et al., "Reproducibility of quantitative coronary analysis", International Journal of Cardiovascular Imaging, vol. 12, No. 3, Sep. 1996, pp. 197-203, doi: 10.1007/BF01806223.
Sizarov et al., "Valve Interventions in Utero: Understanding the Timing, Indications, and Approaches", Canadian Journal of Cardiology, vol. 33, No. 9, Sep. 2017, pp. 1150-1158, doi: 10.1016/j.cjca.2017.06.009.
Sklansky et al., "Fetal Cardiac Screening: What Are We (and Our Guidelines) Doing Wrong?", Journal of Ultrasound in Medicine, vol. 35, No. 4, Apr. 2016, pp. 679-681, doi: 10.7863/ultra.15.07021.
Smith Jr et al., "ACC/AHA Guidelines of Percutaneous Coronary Interventions (Revision of the 1993 PTCA Guidelines)—Executive Summary", Circulation, vol. 103, No. 24, Jun. 19, 2001, pp. 3019-3041, doi: 10.1161/01.cir.103.24.3019.
Son et al., "Retinal Vessel Segmentation in Fundoscopic Images with Generative Adversarial Networks", arXiv:1706.09318v1, Jun. 28, 2017, 9 pgs.
Sun et al., "Prenatal detection of critical cardiac outflow tract anomalies remains suboptimal despite revised obstetrical imaging guidelines", Congenital Heart Disease, vol. 13, No. 5, Jul. 18, 2018, pp. 748-756, doi: 10.1111/chd.12648.
Syeda-Mahmood et al., "Automatic Selection of Keyframes from Angiogram Videos", 20th International Conference on Pattern Recognition, Aug. 23-26, 2010, pp. 4008-4011, doi: 10.1109/ICPR.2010.975.
Tran et al., "A Closer Look at Spatiotemporal Convolutions for Action Recognition", arXiv:1711.11248v3, Apr. 12, 2018, pp. 1-10.
Tsai et al., "Contemporary Incidence, Predictors, and Outcomes of Acute Kidney Injury in Patients Undergoing Percutaneous Coronary Interventions: Insights From the NCDR Cath-PCI Registry", JACC: Cardiovascular Interventions, vol. 7, No. 1, Jan. 20, 2014, pp. 1-9, doi: 10.1016/j.jcin.2013.06.016.
Tuncalp et al., "WHO recommendations on antenatal care for a positive pregnancy experience—going beyond survival", BJOG: An International Journal of Obstetrics & Gynaecology, vol. 124, No. 6, May 2017, pp. 860-862, doi: 10.1111/1471-0528.14599.
Virani et al., "Heart Disease and Stroke Statistics—2020 Update: A Report From the American Heart Association", Circulation, vol. 141, No. 9, Mar. 3, 2020, pp. e139-e596, doi: 10.1161/CIR.0000000000000757. (Presented in 2 Parts).
Vlontzos et al., "Deep Segmentation and Registration in X-Ray Angiography Video", arXiv:1805.06406v2, Aug. 3, 2018, 11 pgs.
Witteles et al., "Use and overuse of left ventriculography", American Heart Journal, vol. 163, No. 4, Apr. 2012, pp. 617-623-623.e1, doi: 10.1016/j.ahj.2011.12.018.
Wright et al., "Relation of Prenatal Diagnosis With One-Year Survival Rate for Infants With Congenital Heart Disease", The American journal of cardiology, vol. 113, No. 6, Mar. 15, 2014, pp. 1041-1044, doi: 10.1016/j.amjcard.2013.11.065.
Yancy et al., "2013 ACCF/AHA Guideline for the Management of Heart Failure: A Report of the American College of Cardiology Foundation/American Heart Association Task Force on Practice Guidelines", Circulation, vol. 128, No. 16, Oct. 15, 2013, pp. e240-e327, doi: 10.1161/CIR.0b013e31829e8776.
Yang et al., "Major Vessel Segmentation on X-ray Coronary Angiography using Deep Networks with a Novel Penalty Loss Function", Proceedings of Machine Learning Research—Under Review, 2019, pp. 1-5.
Zech et al., "Variable generalization performance of a deep learning model to detect pneumonia in chest radiographs: A cross-sectional study", PLOS Medicine, vol. 15, No. 11, Article e1002683, Nov. 6, 2018, 17 pgs., doi: 10.1371/journal.pmed.1002683.
Zhang et al., "Comparison of Physician Visual Assessment With Quantitative Coronary Angiography in Assessment of Stenosis Severity in China", JAMA Internal Medicine, vol. 178, No. 2, Jan. 16, 2018, pp. 239-247, doi: 10.1001/jamainternmed.2017.7821.

(56) References Cited

OTHER PUBLICATIONS

Zhang et al., "Fully Automated Echocardiogram Interpretation in Clinical Practice", Circulation, vol. 138, No. 16, Oct. 16, 2018, pp. 1623-1635, doi: 10.1161/CIRCULATIONAHA.118.034338.
Zhao et al., "Cardiac axis shift within the cardiac cycle of normal fetuses and fetuses with congenital heart defect", Ultrasound in Obstetrics & Gynecology, vol. 46, No. 5, Nov. 2015, pp. 558-563, doi: 10.1002/uog.14768.
Zhao et al., "Fetal cardiac axis in tetralogy of Fallot: associations with prenatal findings, genetic anomalies and postnatal outcome", Ultrasound in Obstetrics & Gynecology, vol. 50, No. 1, Jul. 2017, pp. 58-62, doi: 10.1002/uog.15998.
Zhou et al., "Automated Deep Learning Analysis of Angiography Video Sequences for Coronary Artery Disease", arXiv:2101.12505v1, Jan. 29, 2021, pp. 1-10.
Zir et al., "Interobserver Variability in Coronary Angiography", Circulation, vol. 53, No. 4, Apr. 1976, pp. 627-632, doi: 10.1161/01.cir.53.4.627.
Zou et al., "Statistical Validation of Image Segmentation Quality Based on a Spatial Overlap Index", Academic Radiology, vol. 11, No. 2, Feb. 2004, pp. 178-189, doi: 10.1016/S1076-6332(03)00671-8.
Zuiderveld, "Contrast Limited Adaptive Histogram Equalization", Graphics Gems IV, Aug. 1, 1997, pp. 474-485, doi: 10.1016/B978-0-12-336156-1.50061-6.
Extended European Search Report received for European Application No. 19863399.2, Search completed May 20, 2022, Mailed Jun. 1, 2022, 9 pgs.
International Preliminary Report on Patentability received for International Application No. PCT/US2019/051767, Report issued Mar. 23, 2021, Mailed Apr. 1, 2021, 6 pgs.
International Preliminary Report on Patentability received for International Application No. PCT/US2022/072817, Report issued Nov. 21, 2023, Mailed on Dec. 21, 2023, 6 pgs.
International Search Report and Written Opinion received for International Application No. PCT/US2019/051767, Search completed Nov. 18, 2019, Mailed Dec. 3, 2019, 14 pgs.
International Search Report and Written Opinion received for International Application No. PCT/US2022/072817, Search completed Aug. 31, 2022, Mailed Oct. 5, 2022, 14 pgs.
"Practice Bulletin No. 175: Ultrasound in Pregnancy", Committee on Practice Bulletins, Obstetrics & Gynecology, vol. 128, No. 6, Dec. 2016, pp. e241-e256, doi: 10.1097/AOG.0000000000001815.
"WHO guideline recommendations on digital interventions for health system strengthening", World Health Organization, 2019, 150 pgs.
AIUM, "AIUM Practice Guideline for the Performance of Fetal Echocardiography", Journal of Ultrasound in Medicine, vol. 32, No. 6, Jun. 2013, pp. 1067-1082, doi: 10.7863/ultra.32.6.1067.
Ardila et al., "End-to-end lung cancer screening with three-dimensional deep learning on low-dose chest computed tomography", Nature Medicine, vol. 25, May 20, 2019, pp. 954-961, doi: 10.1038/s41591-019-0447-x.
Attia et al., "Screening for cardiac contractile dysfunction using an artificial intelligence-enabled electrocardiogram", Nature Medicine, vol. 25, No. 1, Jan. 7, 2019, pp. 70-74, doi: 10.1038/s41591-018-0240-2.
Au et al., "Automated Characterization of Stenosis in Invasive Coronary Angiography Images with Convolutional Neural Networks", arXiv:1807.10597, Jul. 19, 2018, 12 pgs.
Avram et al., "A digital biomarker of diabetes from smartphone-based vascular signals", Nature Medicine, vol. 26, No. 10, Aug. 17, 2020, pp. 1576-1582, doi: 10.1038/s41591-020-1010-5.
Avram et al., "Cathai: Fully Automated Coronary Angiography Interpretation and Stenosis Detection Using a Deep Learning-based Algorithmic Pipeline", Journal of the American College of Cardiology, vol. 77, No. 18, Supplement 1, May 3, 2021, p. 3244, doi: 10.1016/S0735-1097(21)04598-8.
Bensemlali et al., "Neonatal management and outcomes of prenatally diagnosed CHDs", Cardiology in the Young, vol. 27, No. 2, Mar. 2017, pp. 344-353, doi: 10.1017/S1047951116000639.
Best et al., "Long-Term Survival of Individuals Born With Congenital Heart Disease: A Systematic Review and Meta-Analysis", Journal of the American Heart Association, vol. 5, No. 6, Article e002846, Jun. 16, 2016, 16 pgs., doi: 10.1161/JAHA.115.002846.
Bland et al., "Statistical methods for assessing agreement between two methods of clinical measurement", Lancet, vol. 327, No. 8476, Feb. 8, 1986, pp. 307-310, doi: 10.1016/S0140-6736(86)90837-8.
Bozkurt et al., "Universal Definition and Classification of Heart Failure", Journal of Cardiac Failure, vol. 27, No. 4, Apr. 2021, pp. 387-413, doi: 10.1016/j.cardfail.2021.01.022.
Buethe et al., "Eponymous Cardiovascular Surgeries for Congenital Heart Diseases—Imaging Review and Historical Perspectives", Current Problems in Diagnostic Radiology, vol. 44, No. 4, Jul.-Aug. 2015, pp. 303-320, doi: 10.1067/j.cpradiol.2015.02.003.
Carvalho et al., "ISUOG Practice Guidelines (updated): sonographic screening examination of the fetal heart", Ultrasound in Obstetrics & Gynecology, vol. 41, No. 3, Mar. 2013, pp. 348-359, doi: 10.1002/uog.12403.
Chollet, "Xception: Deep Learning with Depthwise Separable Convolutions", IEEE Conference on Computer Vision and Pattern Recognition, Jul. 21-26, 2017, pp. 1800-1807, doi: 10.1109/CVPR.2017.195.
Chu et al., "Prenatal diagnosis of congenital heart diseases by fetal echocardiography in second trimester: a Chinese multicenter study", Acta Obstetricia et Gynecologica Scandinavica, vol. 96, No. 4, Apr. 2017, pp. 454-463, doi: 10.1111/aogs.13085.
Corcoran et al., "Prenatal detection of major congenital heart disease—optimising resources to improve outcomes", European Journal of Obstetrics & Gynecology and Reproductive Biology, vol. 203, Aug. 2016, pp. 260-263, doi: 10.1016/j.ejogrb.2016.06.008.
Deligonul et al., "Contrast Cine Left Ventriculography: Comparison of Two Pigtail Catheter Shapes and Analysis of Factors Determining the Final Quality", Catheterization and Cardiovascular Diagnosis, vol. 37, No. 4, Apr. 1996, pp. 428-433, doi: 10.1002/(SICI)1097-0304(199604)37:4<428::AID-CCD12>3.0.CO;2-B.
Donofrio et al, "Diagnosis and Treatment of Fetal Cardiac Disease A Scientific Statement From the American Heart Association", Circulation, vol. 129, No. 21, May 27, 2014, pp. 2183-2242, doi: 10.1161/01.cir.0000437597.44550.5d.
Esteva et al., "Dermatologist-level classification of skin cancer with deep neural networks", Nature, vol. 542, No. 7639, Jan. 25, 2017, pp. 115-118, doi: 10.1038/nature21056.
Fan et al., "Multichannel Fully Convolutional Network for Coronary Artery Segmentation in X-Ray Angiograms", IEEE Access, vol. 6, Aug. 10, 2018, pp. 44635-44643, doi: 10.1109/ACCESS.2018.2864592.
Fearon et al., "Accuracy of Fractional Flow Reserve Derived From Coronary Angiography", Circulation, vol. 139, No. 4, Jan. 22, 2019, pp. 477-484, doi: 10.1161/CIRCULATIONAHA.118.037350.
Feichtenhofer, "X3D: Expanding Architectures for Efficient Video Recognition", IEEE/CVF Conference on Computer Vision and Pattern Recognition (CVPR), Jun. 13-19, 2020, pp. 203-213, doi: 10.1109/CVPR42600.2020.00028.
Folland et al., "Assessment of Left Ventricular Ejection Fraction and Volumes by Real-time, Two-dimensional Echocardiography. A Comparison of Cineangiographic and Radionuclide Techniques", Circulation, vol. 60, No. 4, Oct. 1979, pp. 760-766. doi: 10.1161/01.cir.60.4.760.
Freud et al., "Fetal Aortic Valvuloplasty for Evolving Hypoplastic Left Heart Syndrome: Postnatal Outcomes of the First 100 Patients", Circulation, vol. 130, No. 8, Aug. 19, 2014, pp. 638-645, doi: 10.1161/CIRCULATIONAHA.114.009032.
Friedberg et al., "Prenatal Detection of Congenital Heart Disease", The Journal of Pediatrics, vol. 155, No. 1, Jul. 2009, pp. 26-31 doi: 10.1016/j.jpeds.2009.01.050.
Garrone et al., "Quantitative Coronary Angiography in the Current Era: Principles and Applications", Journal of Interventional Cardiology, vol. 22, No. 6, Dec. 1, 2009, pp. 527-536, doi: 10.1111/j.1540-8183.2009.00491.x.

(56) References Cited

OTHER PUBLICATIONS

Glas et al., "The diagnostic odds ratio: a single indicator of test performance", Journal of Clinical Epidemiology, vol. 56, No. 11, Nov. 2003, pp. 1129-1135, doi: 10.1016/s0895-4356(03)00177-x.
Goldinfeld et al., "Evaluation of fetal cardiac contractility by two-dimensional ultrasonography", Prenatal Diagnosis, vol. 24, No. 10, Oct. 2004, pp. 799-803, doi: 10.1002/pd.880.
Grundeken et al., "Inter-Core Lab Variability in Analyzing Quantitative Coronary Angiography for Bifurcation Lesions", Journal of the American College of Cardiology (JACC): Cardiovascular Interventions, vol. 8, No. 2, Feb. 2015, pp. 305-314, doi: 10.1016/j.jcin.2014.12.002.
Gulshan et al., "Development and Validation of a Deep Learning Algorithm for Detection of Diabetic Retinopathy in Retinal Fundus Photographs", Journal of the American Medical Association (JAMA), vol. 316, No. 22, Dec. 13, 2016, pp. 2402-2410, doi: 10.1001/jama.2016.17216.
Hannun et al., "Cardiologist-level arrhythmia detection and classification in ambulatory electrocardiograms using a deep neural network", Nature Medicine, vol. 25, Jan. 2019, pp. 65-69, doi: 10.1038/s41591-018-0268-3.
Harold et al., "Update of the Clinical Competence Statement on Coronary Artery Interventional Procedures", Circulation, vol. 128, No. 4, Jul. 23, 2013, pp. 436-472, doi: 10.1161/CIR.0b013e318299cd8a.
He et al., "Spatial Pyramid Pooling in Deep Convolutional Networks for Visual Recognition", Lecture Notes in Computer Science, vol. 8691, 2014, pp. 346-361, doi: 10.1007/978-3-319-10578-9_23.
Heidenreich et al., "Variation in Use of Left Ventriculography in the Veterans Affairs Health Care System", Circulation: Cardiovascular Quality and Outcomes, vol. 6, No. 6, Nov. 1, 2013, pp. 687-693, doi: 10.1161/CIRCOUTCOMES.113.000199.
Hendel et al., "Appropriate Use Criteria for Cardiac Radionuclide Imaging", Circulation, vol. 119, No. 22, Jun. 9, 2009, pp. e561-e587, doi: 10.1161/CIRCULATIONAHA.109.192519.
Hoang et al., "Deep RetinaNet-Based Detection and Classification of Road Markings by Visible Light Camera Sensors", Sensors, vol. 19, No. 2, Article 281, Jan. 11, 2019, 25 pgs., doi: 10.3390/s19020281.
Holland et al., "Prenatal diagnosis of critical congenital heart disease reduces risk of death from cardiovascular compromise prior to planned neonatal cardiac surgery: a meta-analysis", Ultrasound in Obstetrics & Gynecology, vol. 45, No. 6, Jun. 2015, pp. 631-638, doi: 10.1002/uog.14882.
Jiang et al., "To Trust Or Not To Trust A Classifier", arXiv:1805.11783v2, Oct. 26, 2018, 25 pgs.
Karpathy et al., "Large-scale Video Classification with Convolutional Neural Networks", IEEE Conference on Computer Vision and Pattern Recognition, Jun. 23-28, 2014, 8 pgs., doi: 10.1109/CVPR.2014.223.
Katritsis et al., "Limitations of Coronary Angiography: An Underestimated Problem?", Clinical Cardiology, vol. 14, No. 1, Jan. 1991, pp. 20-24, doi: 10.1002/clc.4960140106.
Keane et al., "Comparative Validation of Quantitative Coronary Angiography Systems", Circulation, vol. 91, No. 8, Apr. 15, 1995, pp. 2174-2183, doi: 10.1161/01.CIR.91.8.2174.
Khatri et al., "Ischemic Strokes After Cardiac Catheterization: Opportune Thrombolysis Candidates?", Archives of Neurology, vol. 63, No. 6, Jun. 2006, pp. 817-821, doi: 10.1001/archneur.63.6.817.
Kingma et al., "Adam: A Method for Stochastic Optimization", arXiv:1412.6980v9, Jan. 30, 2017, 15 pgs.
Krizhevsky et al., "ImageNet Classification with Deep Convolutional Neural Networks", Advances in Neural Information Processing Systems (NIPS), vol. 25, Dec. 3, 2012, pp. 1097-1105.
Kulhare et al., "Key Frame Extraction for Salient Activity Recognition", IEEE 23rd International Conference on Pattern Recognition (ICPR), Dec. 4-8, 2016, pp. 835-840, doi: 10.1109/ICPR.2016.7899739.
Kussmaul III et al., "Accuracy and Reproducibility of Visual Coronary Stenosis Estimates Using Information from Multiple Observers", Clinical Cardiology, vol. 15, No. 3, Mar. 1992, pp. 154-162, doi: 10.1002/clc.4960150305.
Lang et al., "Recommendations for Cardiac Chamber Quantification by Echocardiography in Adults: An Update from the American Society of Echocardiography and the European Association of Cardiovascular Imaging", Journal of the American Society of Echocardiography, vol. 28, No. 1, Jan. 2015, pp. 1-39.e14, doi: 10.1016/j.echo.2014.10.003.
Leape et al., "Effect of variability in the interpretation of coronary angiograms on the appropriateness of use of coronary revascularization procedures", American Heart Journal, vol. 139, No. 1, Part: 1, Jan. 2000, pp. 106-113, doi: 10.1016/S0002-8703(00)90316-8.
Lecun et al., "Deep learning", Nature, vol. 521, No. 7553, May 27, 2015, pp. 436-444, doi: 10.1038/nature14539.
Letourneau et al., "Advancing Prenatal Detection of Congenital Heart Disease: A Novel Screening Protocol Improves Early Diagnosis of Complex Congenital Heart Disease", Journal of Ultrasound in Medicine, vol. 37, No. 5, May 2018, pp. 1073-1079, doi: 10.1002/jum.14453.
Levey et al., "Using Standardized Serum Creatinine Values in the Modification of Diet in Renal Disease Study Equation for Estimating Glomerular Filtration Rate", Annals of Internal Medicine, vol. 145, No. 4, Aug. 15, 2006, pp. 247-254, doi: 10.7326/0003-4819-145-4-200608150-00004.
Levine et al., "Guideline for Percutaneous Coronary Intervention: Executive Summary", Circulation, vol. 124, No. 23, Dec. 6, 2011, pp. 2574-2609, doi: 10.1161/CIR.0b013e31823a5596.
Li et al., "Efficacy of prenatal diagnosis of major congenital heart disease on perinatal management and perioperative mortality: a meta-analysis", World Journal of Pediatrics, vol. 12, No. 3, Aug. 15, 2016, pp. 298-307, doi: 10.1007/s12519-016-0016-z.
Lin et al., "Focal Loss for Dense Object Detection", IEEE International Conference on Computer Vision (ICCV), Oct. 22-29, 2017, pp. 2980-2988, doi: 10.1109/ICCV.2017.324.
Liu, "Learning to Rank for Information Retrieval", Foundations and Trends in Information Retrieval, vol. 3, No. 3, Mar. 1, 2009, pp. 225-331, doi: 10.1561/1500000016.
Liu et al., "Fetal echocardiography for congenital heart disease diagnosis: a meta-analysis, power analysis and missing data analysis", European Journal of Preventive Cardiology, vol. 22, No. 12, Dec. 1, 2015, pp. 1531-1547, doi: 10.1177/2047487314551547.
Liu et al., "On the Variance of the Adaptive Learning Rate and Beyond", arXiv:1908.03265v4, Oct. 26, 2021, pp. 1-14.
Madani et al, "Fast and accurate view classification of echocardiograms using deep learning", NPJ Digital Medicine, vol. 1, No. 6, Mar. 21, 2018, 8 pgs., doi:10.1038/s41746-017-0013-1.
Maddox et al., "Nonobstructive Coronary Artery Disease and Risk of Myocardial Infarction", Journal of the American Medical Association (JAMA), vol. 312, No. 17, Nov. 5, 2014, pp. 1754-1763, doi: 10.1001/jama.2014.14681.
Marcus et al., "Visual Estimates of Percent Diameter Coronary Stenosis: "A Battered Gold Standard"", Journal of the American College of Cardiology, vol. 11, No. 4, Apr. 1988, pp. 882-885, doi: 10.1016/0735-1097(88)90226-4.
Marenzi et al., "Contrast-Induced Nephropathy in Patients Undergoing Primary Angioplasty for Acute Myocardial Infarction", Journal of the American College of Cardiology, vol. 44, No. 9, Nov. 2, 2004, pp. 1780-1785, doi: 10.1016/j.jacc.2004.07.043.
Marine et al., "High-Grade Atrioventricular Block Caused by His-Purkinje Injury During Contrast Left Ventriculography", Circulation, vol. 104, No. 14, Oct. 2, 2001, pp. e77-e78, doi: 10.1161/hc3901.096398.
Miceli, "A review of the diagnostic accuracy of fetal cardiac anomalies", Australasian Journal of Ultrasound in Medicine, vol. 18, No. 1, Feb. 2015, pp. 3-9, doi: 10.1002/j.2205-0140.2015.tb00024.
Mozaffarian et al., "Heart Disease and Stroke Statistics—2015 Update", A Report from the American Heart Association, Circulation, vol. 131, No. 4, Jan. 27, 2015, pp. e29-e322, doi: 10.1161/CIR.0000000000000152.
Mundhenk et al., "Efficient Saliency Maps for Explainable AI", arXiv:1911.11293, Mar. 9, 2020, pp. 1-42.

(56) References Cited

OTHER PUBLICATIONS

Murphy et al., "Mortality in the United States, 2017", NCHS Data Brief, No. 328, Nov. 2018, pp. 1-8.
Nallamothu et al., "Comparison of Clinical Interpretation With Visual Assessment and Quantitative Coronary Angiography in Patients Undergoing Percutaneous Coronary Intervention in Contemporary Practice: The Assessing Angiography (A2) Project", Circulation, vol. 127, No. 17, Apr. 30, 2013, pp. 1793-1805, doi: 10.1161/CIRCULATIONAHA.113.001952.
Nasr-Esfahani et al., "Segmentation of vessels in angiograms using convolutional neural networks", Biomedical Signal Processing and Control, vol. 40, Feb. 2018, pp. 240-251, doi: 10.1016/j.bspc.2017.09.012.
Nasr-Esfahani et al., "Vessel Extraction in X-Ray Angiograms Using Deep Learning", Annual International Conference of the IEEE Engineering in Medicine and Biology Society, Aug. 16-20, 2016, pp. 643-646, doi: 10.1109/EMBC.2016.7590784.
Nicod et al., "Influence on Prognosis and Morbidity of Left Ventricular Ejection Fraction With and Without Signs of Left Ventricular Failure After Acute Myocardial Infarction", American Journal of Cardiology, vol. 61, No. 15, Jun. 1, 1988, pp. 1165-1171, doi: 10.1016/0002-9149(88)91148-4.
Oster et al., "A population-Based Study of the Association of Prenatal Diagnosis With Survival Rate for Infants With Congenital Heart Defects", The American Journal of Cardiology, vol. 113, No. 6, Mar. 15, 2014, pp. 1036-1040, doi: 10.1016/j.amjcard.2013.11.066.
Otsu, "A Threshold Selection Method from Gray-Level Histograms", IEEE Transactions of Systems, Man and Cybernetics, vol. SMC-9, No. 1, Jan. 31, 1979, pp. 62-66, doi: 10.1109/TSMC.1979.4310076.
Ouyang et al., "Video-based Ai for beat-to-beat assessment of cardiac function", Nature, vol. 580, No. 7802, Mar. 25, 2020, pp. 252-256, doi: 10.1038/s41586-020-2145-8.
Patel et al., "Appropriate Use Criteria for Coronary Revascularization in Patients With Stable Ischemic Heart Disease", Journal of Nuclear Cardiology, vol. 24, No. 5, Jun. 12, 2017, pp. 1759-1792, doi: 10.1007/s12350-017-0917-9.
Patel et al., "Appropriate Use Criteria for Coronary Revascularization in Patients With Stable Ischemic Heart Disease", Journal of the American College of Cardiology, vol. 69, No. 17, May 2, 2017, pp. 2212-2241, doi: 10.1016/j.jacc.2017.02.001.
Pepine et al., "ACC/AHA guidelines for cardiac catheterization and cardiac catheterization laboratories. American College of Cardiology/American Heart Association Ad Hoc Task Force on Cardiac Catheterization", Circulation, vol. 84, No. 5, Nov. 1, 1991, pp. 2213-2247, doi: 10.1161/01.cir.84.5.2213.
Piazza et al., "Fluoroscopic "heart chamber" anatomy—the case for imaging modality-independent terminology", EuroIntervention, vol. 12, Supplement Y, Sep. 18, 2016, pp. Y9-Y15, doi: 10.4244/EIJV12SYA3.
Pinheiro et al., "Accuracy of Prenatal Diagnosis of Congenital Cardiac Malformations: Acurácia do diagnóstico pré-natal de cardiopatias congênitas" Revista Brasileira de Ginecologia e Obstetrícia, vol. 41, No. 1, Dec. 14, 2018, pp. 11-16, doi: 10.1055/s-0038-1676058.
Ponikowski et al., "2016 ESC Guidelines for the diagnosis and treatment of acute and chronic heart failure", European Journal of Heart Failure, vol. 18, No. 8, Aug. 2016, pp. 891-975, doi: 10.1002/ejhf.592.
Ramanathan et al., "Coronary blood flow", Continuing Education in Anaesthesia Critical Care & Pain, vol. 5, No. 2, Apr. 2005, pp. 61-64, doi: 10.1093/bjaceaccp/mki012.
Raphael et al., "A "Significant" Stenosis: Thirty Years On", Lancet, vol. 1, No. 8631, Jan. 28, 1989, pp. 207-209, doi: 10.1016/s0140-6736(89)91214-2.
Rezatofighi et al., "Generalized Intersection over Union: A Metric and A Loss for Bounding Box Regression", IEEE/CVF Conference on Computer Vision and Pattern Recognition (CVPR), Jun. 15-20, 2019, pp. 658-666, doi: 10.1109/CVPR.2019.00075.
Ronneberger et al., "U-net: Convolutional Networks for Biomedical Image Segmentation", arXiv:1505.04597v1, May 18, 2015, pp. 234-241.
Russakovsky et al., "ImageNet Large Scale Visual Recognition Challenge", arXiv:1409.0575v3, Jan. 30, 2015, 43 pgs.

* cited by examiner

METHOD AND SYSTEM FOR AUTOMATED ANALYSIS OF CORONARY ANGIOGRAMS

CROSS-REFERENCED APPLICATIONS

This application is a national stage of PCT Patent Application No. PCT/US2022/072817, entitled "Method and System for Automated Analysis of Coronary Angiograms" filed Jun. 8, 2022, which claims priority to U.S. Provisional Application 63/208,406 filed on Jun. 8, 2021, the disclosures of which are incorporated by reference in their entirety.

STATEMENT OF FEDERAL SUPPORT

This invention was made with government support under grant no. K23 HL135274 awarded by The National Institutes of Health. The government has certain rights in the invention.

FIELD OF THE DISCLOSURE

The present invention generally relates to methods and system for automatic coronary angiography interpretation using machine learning techniques.

BACKGROUND

Coronary heart disease (CHD) is the leading cause of adult death in the United States and worldwide. Coronary angiography is a minimally-invasive catheter-based procedure that provides the gold-standard diagnostic assessment of CHD is performed more than 1 million times a year in the United States alone. The decision to provide procedural treatment for CHD, either through stent placement or bypass surgery, relies largely upon the determination of whether narrowing of the coronary artery at any location is greater or less than 70% in severity. The most common approach, and present standard-of-care, for determining coronary stenosis severity remains ad-hoc visual assessment, even though this method suffers from high inter-observer variability, operator bias and poor reproducibility. The variability is further exacerbated by the wide range of procedural experience amongst cardiologists: 39.2% of operators in the U.S. perform less than 50 procedures a year, which is considered low-volume. Visual assessment of coronary stenosis severity has therefore been shown to have high variance and inter-observer variability ranging from 15 to 45% and this diagnostic standard has not changed in over 70 years. Variability in stenosis assessment has significant clinical implications, and likely contributes to inappropriate use of coronary artery bypass surgery in 17% of patients and of stents in 10% patients. A standardized and reproducible approach to coronary angiogram interpretation and coronary stenosis assessment would address a clinically impactful unmet need underpinning CHD diagnosis and the critical decision of procedural CHD treatment.

While methodologies to assist with quantifying coronary stenosis severity exist, such as quantitative coronary angiography (QCA), they require significant operator input to function, namely selection of an optimal frame within the angiogram video, manual identification of a reference object (usually the guide catheter), and manual tracing of the vessel wall. The requirement for manual input at multiple steps is time-consuming and has relegated QCA to infrequent clinical use, reserved primarily for research applications.

Further, left ventriculography, imaging of the left ventricle with an injection of significant quantities of iodine dye, may be performed often performed at the time of the coronary angiography to determine the left ventricular ejection fraction (LVEF), which has important diagnostic and therapeutic implications. It has been linked to increase radiation and increase exposure to dye, leading to 2.3 the odds of acute kidney injury post procedure, contributing to increased morbidity, mortality, and hospitalization costs. Despite these known complications and lack of clinical guidelines recommending the procedure, it's use has decreased over time, in favor of alternate modalities such as transthoracic echocardiograms (TTEs), but is still performed in over 50% of the coronary angiogram procedures.

SUMMARY OF THE INVENTION

Various embodiments relate to a method for estimating left ventricular ejection fraction, the method including: producing one or more angiogram images of a patient and an estimate of left ventricular ejection fraction of the patient to produce training data; training a machine learning model with the training data; providing one or more angiogram images of another patient; and estimating the left ventricular ejection fraction of the one or more angiogram images of the other patient using the trained machine learning model.

Various other embodiments relate to a method for estimating arterial stenoses severity, the method including: classifying a primary anatomic structure of one or more angiogram images of a first patient; classifying a projection angle of the one or more angiogram images of the first patient; labeling stenoses within the one or more angiogram images of the first patient classified as including a left or right coronary artery; filtering out certain labels in the one or more angiogram images based on certain classified projection angles; producing one or more angiogram images of a second patient with corresponding estimated stenoses of the second patient to produce training data; training a machine learning model with the training data; and estimating the arterial stenoses severity of the first patient by running the machine learning model on the filtered and labeled one or more angiogram images of the first patient, wherein the machine learning model is only run on angiogram images previously labeled as including stenoses.

Various other embodiments relate to a method of analyzing coronary angiograms, the method including: producing one or more coronary angiogram images with a corresponding estimated feature of the one or more coronary angiogram images to produce training data; training a machine learning model with the training data; and running the machine learning model on another one or more coronary angiogram images to estimate features of the other one or more angiogram images.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Full automation of coronary angiography interpretation previously includes numerous and complex sequences of component tasks which currently require expertise from highly specialized physicians to accomplish. Deep neural networks have recently been applied to various areas of cardiology to automate tasks such as echocardiogram interpretation, and electrocardiogram analysis and coronary angiography vessel segmentation. The potential obstacles to achieving automated angiographic analysis may include use of multiple non-standard projections in most studies due to anatomic variation, multiple objects of interest that change location throughout the video, variable contrast opacification of the artery, coronary artery overlap and "foreshortening," which is caused by 2D visualization of 3D structures, and integration of stenosis estimates across multiple frames of a single video and across projections of the same vessel from multiple videos to determine a final stenosis percentage.

Systems and methods in accordance with many embodiments of the invention are capable of overcoming the limitations of visual assessment of coronary stenosis. In a number of embodiments, a pipeline is utilized that includes multiple deep neural networks which sequentially accomplish a series of tasks which may perform automated assessment of coronary stenosis severity. In several embodiments the pipeline performs a sequence of tasks including (but not limited to): classification of angiographic projection angle, anatomic angiographic structure identification (including identification of the left and right coronary arteries), localization of coronary artery objects including coronary artery segments and stenosis, and determination of coronary stenosis severity. The algorithmic pipeline may provide a broad foundation to accomplish most tasks related to automated coronary angiogram interpretation including assessing coronary artery stenosis severity.

In some embodiments, artificial intelligence using deep learning may be applied to allow sophisticated recognition of subtle pattern in digital data in numerous areas of cardiology including interpretation of electrocardiograms, left ventricular ejection fraction (LVEF) prediction using transthoracic echocardiograms (TTEs) or electrocardiograms and diabetes detection using smart devices such as smartphones. Advantageously, subtle morphological derangements associated with reduced LVEF may be differentiated from a normally functional heart with normal LVEF in routine coronary vessel angiograms using deep learning which may alleviate the need to perform the left ventriculography. In embodiments of the invention, a deep neural network may be trained, validated, and then tested on a large real-world dataset, and then externally validated in a separate dataset.

Example Automated Coronary Angiography Interpretation System and Method

Figure 1:
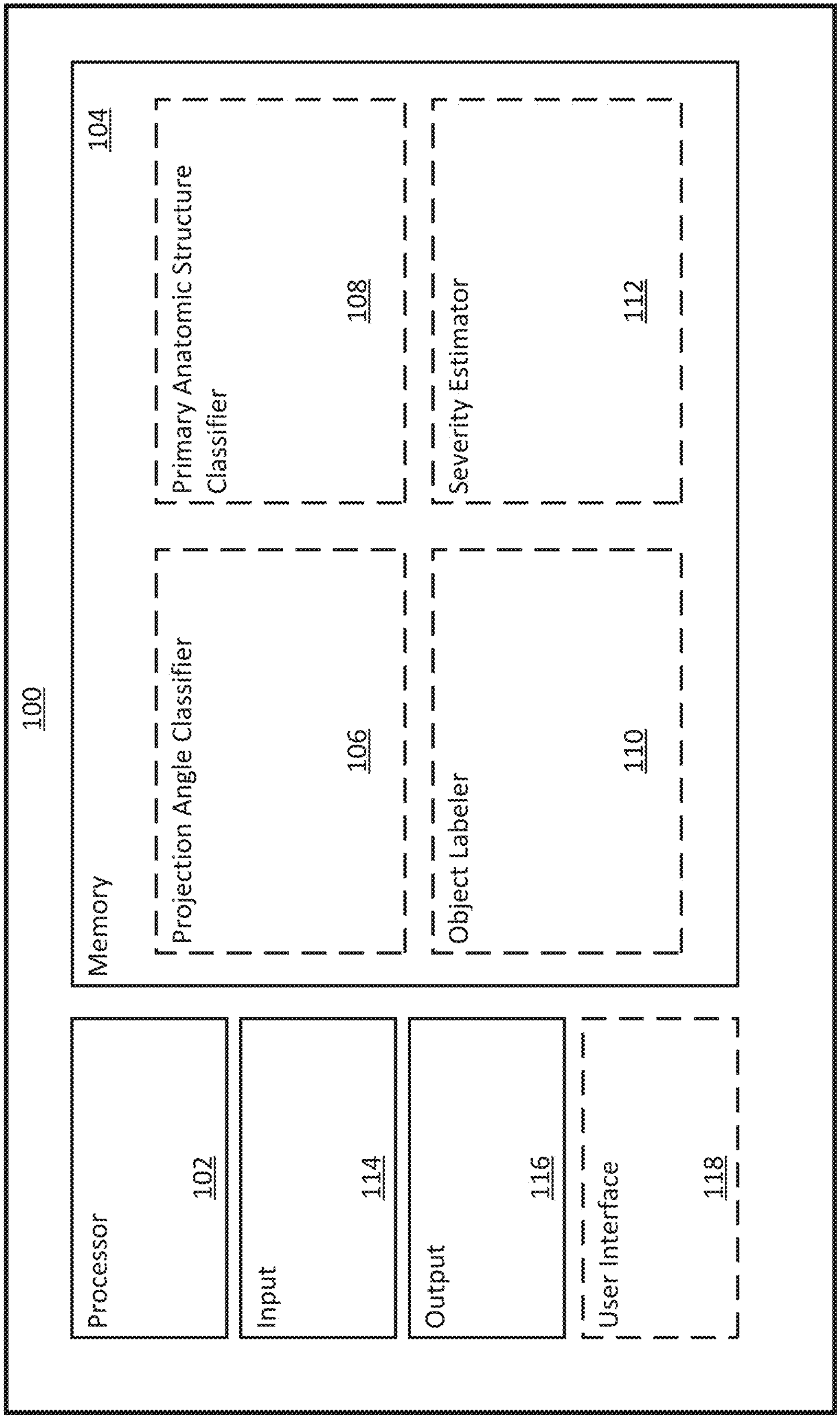
FIG. 1 illustrates a computer for performing machine learning on human anatomical data to produce 3D images in accordance with an embodiment of the invention.

FIG. 1 illustrates a computer 100 for performing machine learning on human anatomical data to produce 3D images in accordance with an embodiment of the invention. The computer 100 includes memory 104 and a processor 102. The memory may include a projection angle classifier 106, a primary anatomic structure classifier 108, an object labeler 110, and a severity estimator 112 which are all executable by the processor 102. The projection angle classifier 106 may perform the functions described as Algorithm 1 below. The primary anatomic structure classifier 108 may perform the functions described as Algorithm 2 below. The object labeler 110 may perform the functions described as Algorithm 3 below. The severity estimator 112 may perform the functions described as Algorithm 4 below. Other algorithms and steps may be performed by other non-illustrated components of the memory. For example, the memory may include programming for executing Algorithm 5 and 6 described below. The projection angle classifier 106, the primary anatomic structure classifier 108, the object labeler 110, and/or the severity estimator 112 may include a neural network, although other types of machine learning may be utilized in accordance with embodiments of the invention. A neural network may be a computer system configured to store a representation of a neural network in memory and to perform processing involving providing inputs to the neural network to obtain outputs. Training data may be fed into the projection angle classifier 106, the primary anatomic structure classifier 108, the object labeler 110, and/or the severity estimator 112 to initially train these components. Unprocessed data may be fed into each of the projection angle classifier 106, the primary anatomic structure classifier 108, the object labeler 110, and/or the severity estimator 112 to produce processed data as described in connection with FIG. 4.

The computer 100 may further include an input 114. The input 114 may be used to input unprocessed data or training data into the projection angle classifier 106, the primary anatomic structure classifier 108, the object labeler 110, and/or the severity estimator 112. The input 114 may be a wired or wireless connection. Input 114 may also be provided through removeable storage, or other types of data transfer mechanisms as may be appropriate. The computer 100 may also include an output 116 which may be used to various processed data such as a patient's estimated coronary artery stenosis severity. The output 116 may be a wired or wireless connection. Output may also be provided through removeable storage, or other types of data transfer mechanisms as may be appropriate. The processor 102 may also be configured to control a display having a graphical user interface 118 to display the estimated coronary artery stenosis. The user interface 118 or another display may allow a user to interact with the computer 100.

Figure 2A:
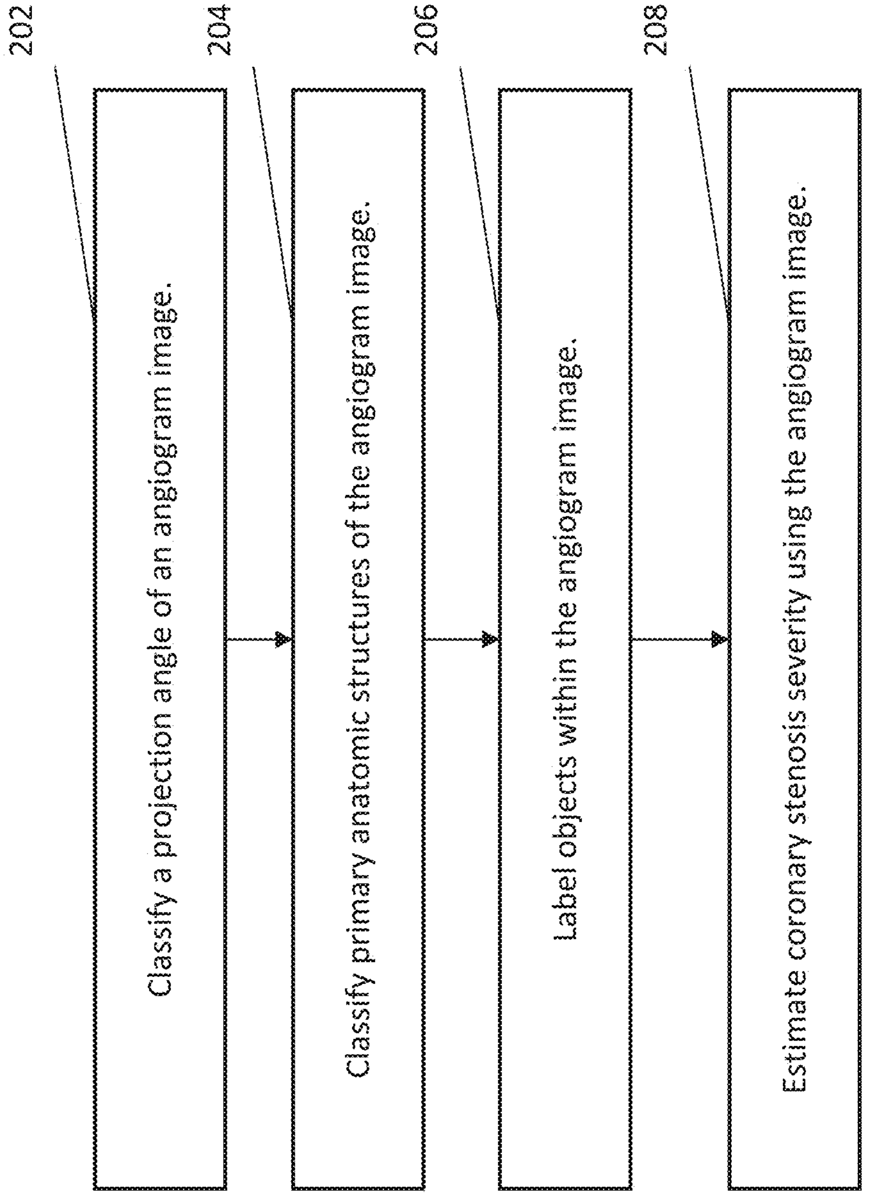
FIGS. 2A and 2B illustrate various flow charts illustrating example methods for estimating coronary stenosis severity using an angiogram image in accordance with embodiments of the invention.
Figure 2B:
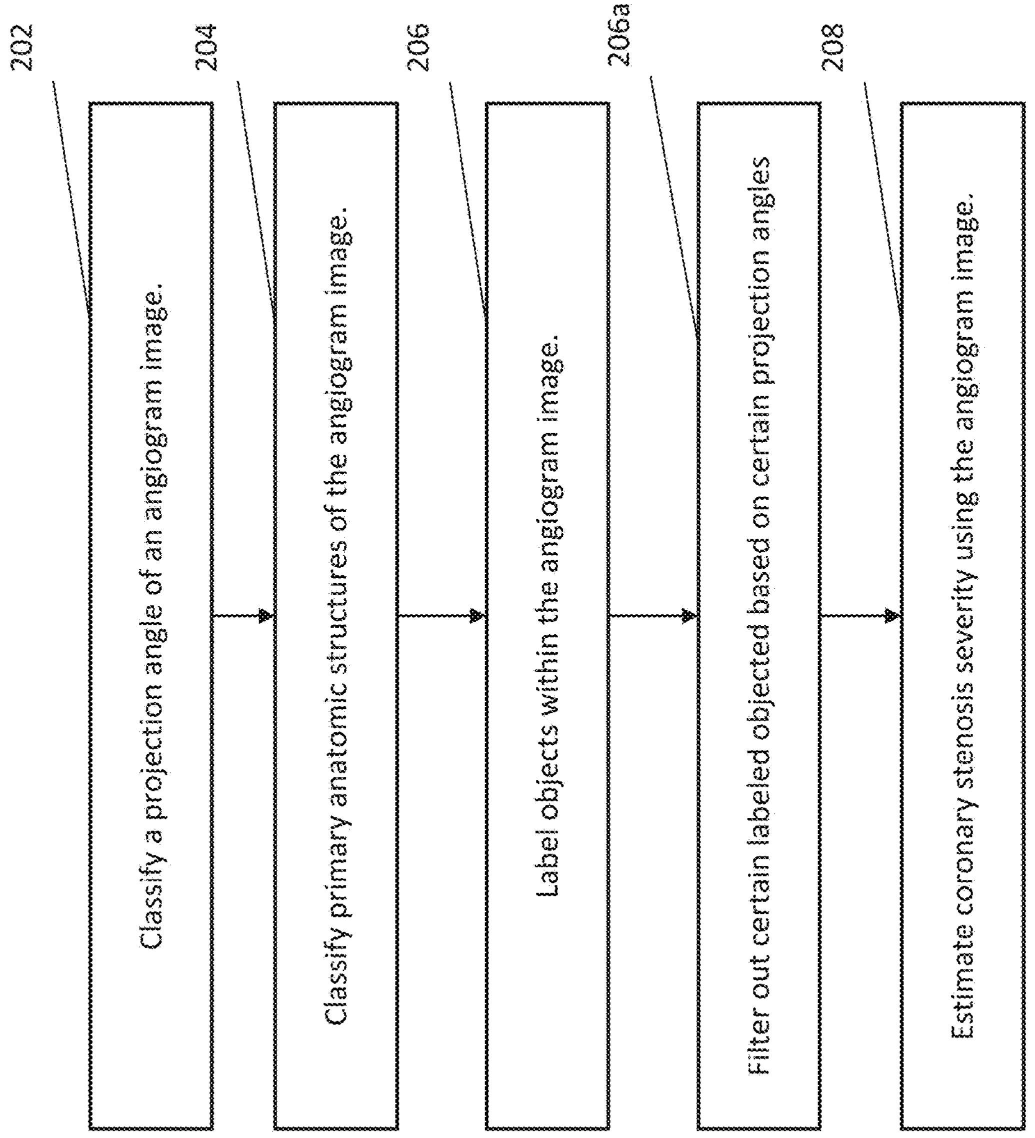

FIGS. 2A and 2B illustrate various flow charts illustrating example methods for estimating coronary stenosis severity using an angiogram image in accordance with embodiments of the invention. The method includes classifying (202) a projection angle of an angiogram image which may include the steps described in Algorithm 1 below. Classifying 202 may be performed by the projection angle classifier 106 described in connection with FIG. 1. The method further includes classifying (204) primary anatomic structures of the angiogram image which may include the steps described in Algorithm 2 below. The classifying 204 may be performed by the primary anatomic structure classifier 108. Classifying 202 the projection angle and classifying 204 the primary anatomic structure may be performed separately to the same angiogram images and the data produced after classifying 202 the projection angle may not be used in classifying 204 the primary anatomic structure. Thus, classifying 204 the primary anatomic structure may be performed before or after classifying 202 the projection angle.

The method further includes labeling (206) objects within the angiogram image which may include the steps described in Algorithm 3 below. Labeling 206 may be performed by the object labeler 110 described in connection with FIG. 1. The labeling 206 may include labeling stenoses. As described below, Algorithm 3 may include Algorithm 3a or Algorithm 3b. In some embodiments, the data obtained after classifying 204 the primary anatomic structure in Algorithm 2 is sorted for right and left coronary artery angiogram images which are the images that are labeled through Algorithm 3. In some embodiments, after the labeling 206, a post-hoc heuristic may be used to exclude results from certain angiographic projections which were obtained during classifying 202 the projection angle of the angiogram image in Algorithm 1. In some embodiments, the excluded results may be based on angiographic projection angles which are known a-priori to be not visible or foreshortened. Thus, as illustrated in FIG. 2B, the method may further include filtering (206*a*) out certain labels in the one or more angiogram images based on certain classified projection angles.

The method further includes estimating (208) coronary stenosis severity using the angiogram image which may include the steps described in Algorithm 4 below. Estimating 208 may be performed by the severity estimator 112 described in connection with FIG. 1. Estimating 208 may be performed only on angiogram images which were labeled as including stenoses in the labeling 206 step and were not excluded based on certain angiographic projections obtained during classifying 202 the projection angle. In some embodiments, the portions of the image labeled as including stenoses may be cropped and enlarged for estimating 208 using Algorithm 4. In some embodiments, the cropping may be performed to a certain aspect ratio. The certain aspect ratio may be one of a number of defined preferred aspect ratios for use with Algorithm 4. In some embodiments, the angiogram image may be cropped to have an aspect ratio of the closest of the defined preferred aspect ratios. In some embodiments, multiple angiogram images of different views of the same artery of the same patient including stenoses may be fed into Algorithm 4. In some embodiments, multiple consecutive video frames of an angiogram may be used as the input during training and estimating rather than a single image. The results of each of these views may be used to estimate the overall stenoses severity. For example, the results may be averaged or the most severe estimate may be used to provide an ultimate estimate. In some embodiments, Algorithm 4 may be replaced with Algorithm 5 and/or 6 as described below.

Figure 3:
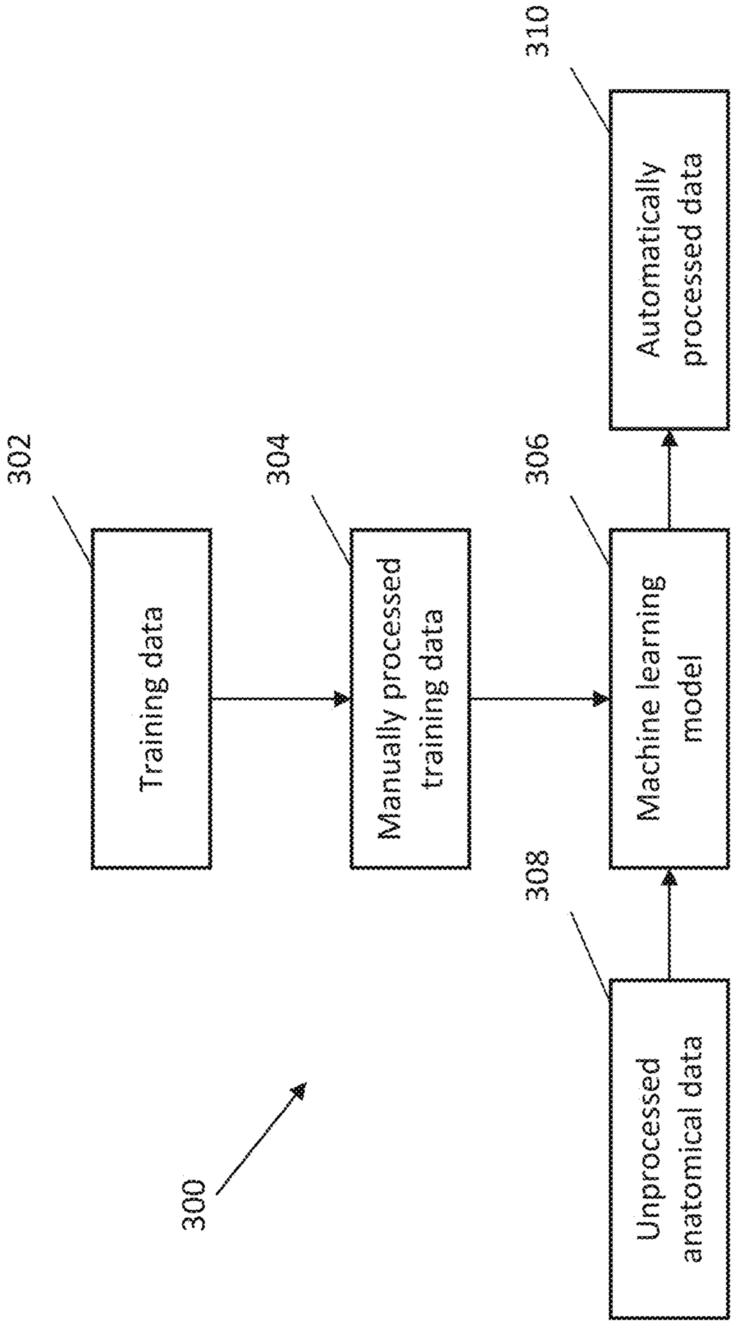
FIG. 3 illustrates a diagram illustrating an example the flow of data into a machine learning model in accordance with an embodiment of the invention.

FIG. 3 illustrates a diagram 300 illustrating an example the flow of data into a machine learning model 306 in accordance with an embodiment of the invention. This diagram 300 is applicable to the functionality of each of the projection angle classifier 106, the primary anatomic structure classifier 108, the object labeler 110, and the severity estimator 112. A training data 302 of unprocessed human anatomical data may be manually processed in order to create manually processed training data 304 which may be used to train the machine learning model 306.

For each of the projection angle classifier 106, the primary anatomic structure labeler 108, the object labeler 110, and the severity estimator 112, the training data 302 and the manually processed training data 304 may be different. For example, for the severity estimator 112, the training data 302 may be the resultant data from the object labeler 110 and the manually processed training data 304 may be a coronary stenosis severity produced by a cardiologist. The training data 302 may include multiple sets of images from multiple patients. After training the machine learning model 306 with the manually processed training data 304, automatically processed data 310 can be generated by feeding unprocessed anatomical data 308 into the trained machine learning model 306. For example, for the projection angle classifier 106, an angiogram image may be fed into the trained machine learning model 306 which may produce automatically processed data 310 which may include the angiographic projection angle of the given angiogram image. The unprocessed anatomical data 308 may include data similar to the training data 302. Although a specific data flow is described above with respect to FIG. 3, one skilled in the art will recognize that any of a variety of data flows may be utilized in accordance with embodiments of the invention.

Figure 4:
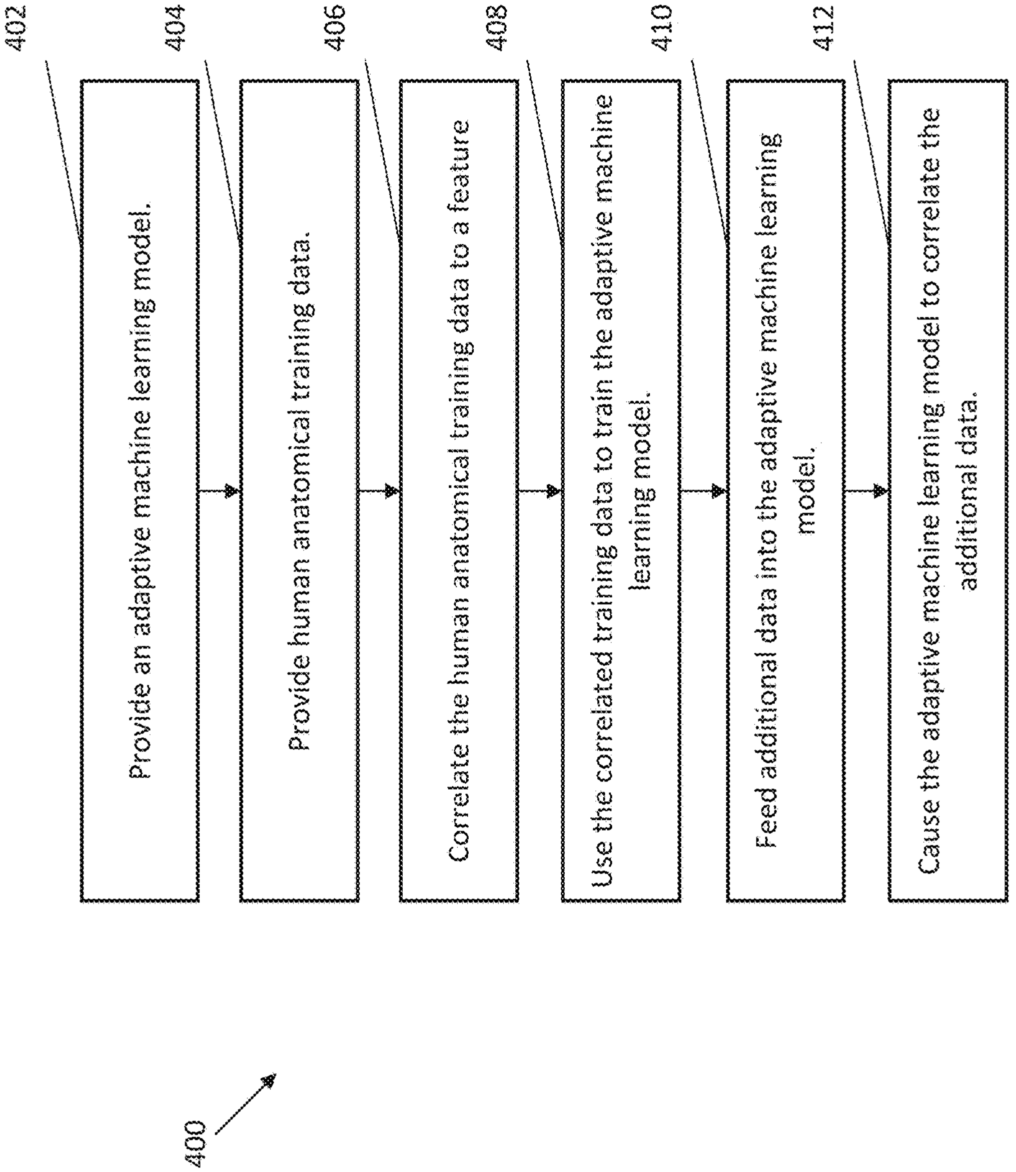
FIG. 4 illustrates a method for correlating human anatomical data in accordance with several embodiments of the invention.

FIG. 4 illustrates a method 400 for correlating human anatomical data in accordance with several embodiments of the invention. The method 400 includes providing (402) an adaptive machine learning model. The method 400 includes providing (404) human anatomical training data. In the case of estimating LVEF, the human anatomical training data may be one or more angiogram images. The method 400 includes correlating (406) the human anatomical training data to a feature. The correlating 406 may include using TTE data from the same patient as the one or more angiogram images to obtain a diagnosed LVEF. The method may include using (408) the correlated training data to train the adaptive machine learning model. The adaptive machine learning model may be trained to estimate LVEF based on one or more angiogram images. The method further includes feeding (410) additional data into the adaptive machine learning model. The method further includes causing (412) the adaptive machine learning model to correlate the additional data. The adaptive machine learning model may correlate the one or more angiogram images to an estimated LVEF. It has been discovered that by using a machine learning technique, LVEF may be estimated based on normal angiogram images without large amounts of dye injected into the patient. Typically, LVEF may not be estimated based on normal angiogram images but require a dye to be injected into the patient which may be harmful to the patient. In some examples, the dye may be injected into the patient aorta which may be extremely dangerous.

While specific steps are described in connection with FIG. 4, these steps are exemplary and one of ordinary skill would understand that these steps may be combined or separated from other contemplated methods. For example, this method may be adapted to be used with Algorithm 1, Algorithm 2, Algorithm 3, and/or Algorithm 4 as described below.

Deep Learning Pipeline for Automated Angiographic Interpretation

In some embodiments, the automated angiographic interpretation may include a sequence of 4 neural network algorithms organized in a pipeline each trained to accomplish a discrete step, with angiographic images "flowing" from one algorithm to the next. The primary steps may include the following:

Classification of the angiographic projection angle of a given angiogram image (Algorithm 1)

Classification of the primary anatomic structure within the angiogram image (Algorithm 2)

Localization of multiple relevant objects within the angiogram image, including coronary artery sub-segments and coronary stenosis (Algorithm 3 a/b)

Estimation of the coronary stenosis severity (expressed as a percentage of artery narrowing) from an image containing a coronary artery segment (Algorithm 4).

Figure 5:
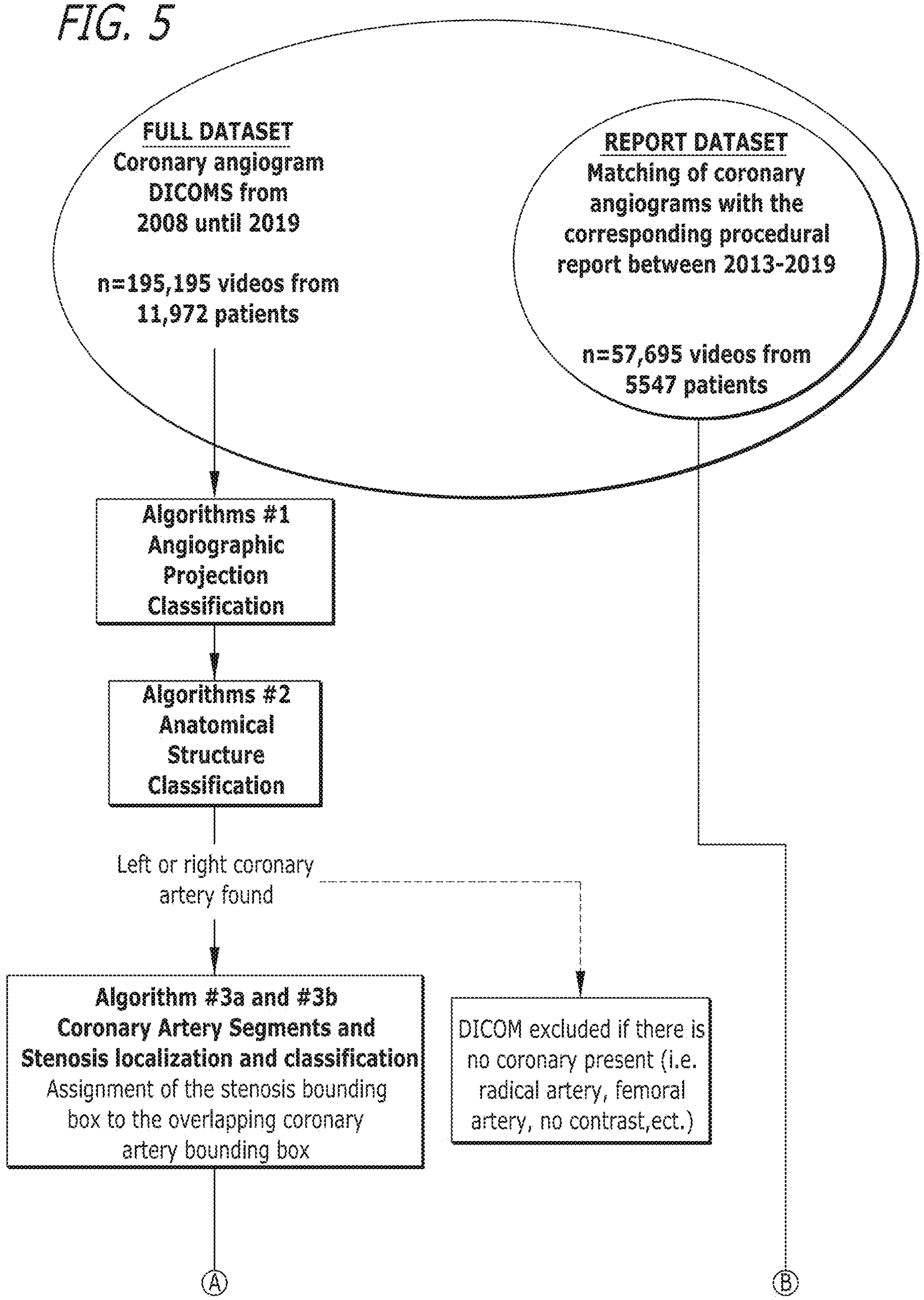
FIG. 5 illustrates a flowchart of an automatic coronary angiography in accordance with an embodiment of the invention.
Figure 5:
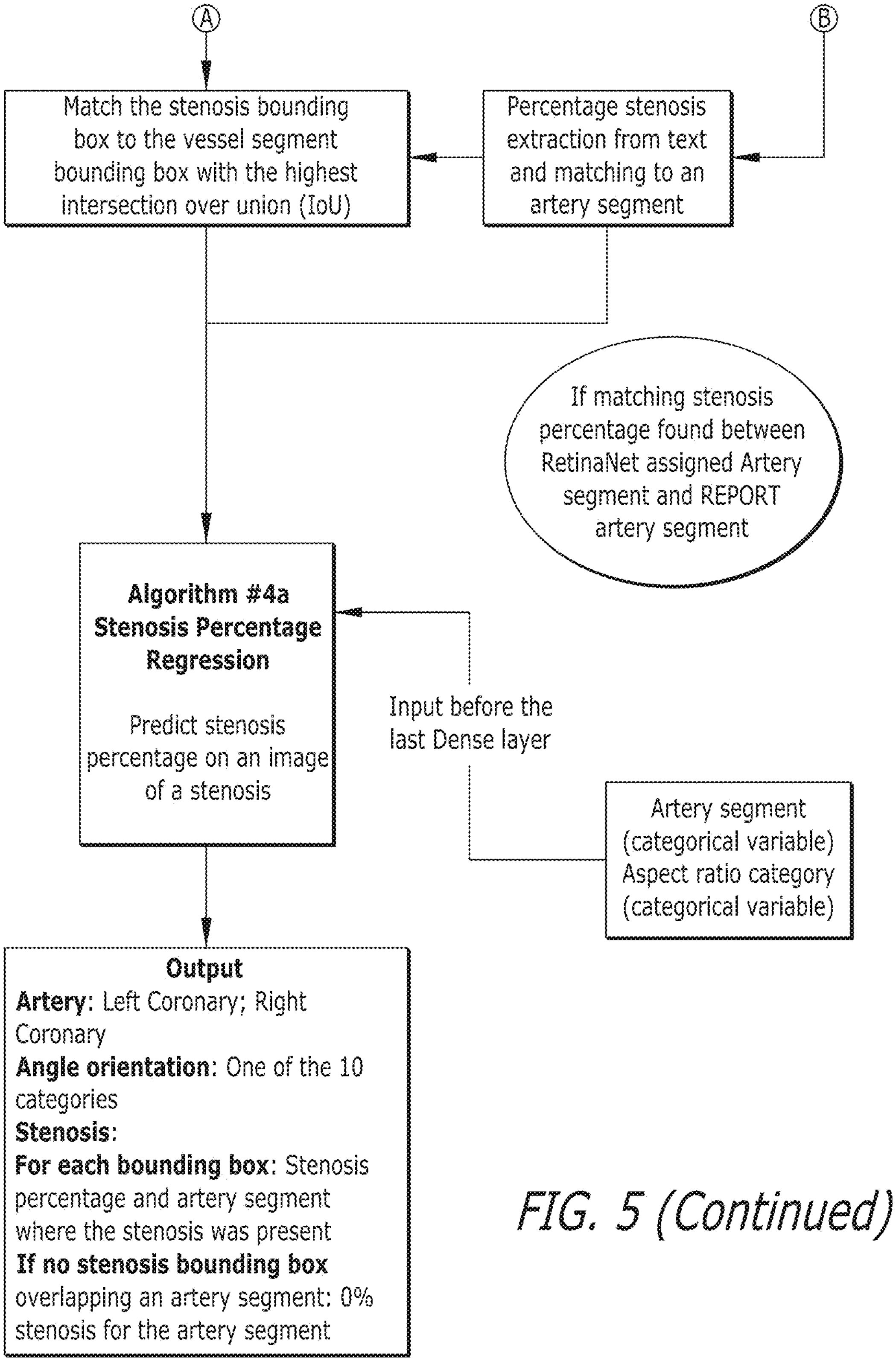

FIG. 5 illustrates a flowchart of an automatic coronary angiography in accordance with an embodiment of the invention. This example automatic coronary angiography includes the primary steps discussed above.

During a standard clinical coronary angiogram procedure, catheters may be inserted into and maneuvered through the aorta to canalize the coronary arteries. Fluoroscopic X-ray videos may visualize the coronary artery lumen during injection of iodine contrast from the catheter into a coronary artery. Multiple individual angiogram videos may be obtained by a cardiologist to optimally visualize arteries and structures in different angiographic projections. Since any single projection angle may capture a two-dimensional representation, multiple different angiogram videos may capture different projection angles to achieve optimal three-dimensional visualization of coronary arteries. Coronary stenosis may be visualized as a narrowing of the contrast-opacified coronary artery and may be reported as a percentage, where 0% represents absence of stenosis and 100% represents a completely occluded coronary artery. The most severe stenosis visualized from any projection angle for that artery segment is then typically reported by the performing cardiologist in the clinical procedural report.

In some embodiments, the algorithmic pipeline may include a sequence of neural network algorithms, each aiming to accomplish a discrete task illustrated in FIG. 5. Each algorithm was developed using training and test (and as appropriate, development) datasets tailored to that algorithm and step, with each algorithm's training and test datasets including non-overlapping patients. In some examples, the Full Dataset, from which all subsequent angiogram datasets were derived may include retrospective, de-identified coronary angiographic studies from patients 18 years or greater. Each complete coronary angiographic study may include multiple videos from a single patient taken from various projection angles. Angiograms may be acquired using Philips (Koninklijke Philips N.V., Amsterdam, Netherlands) or Siemens (Siemens Healthineers, Forchheim, Germany) systems. The Full Dataset may be derived from 11,972 patients, 13,843 angiographic studies and 195,195 videos. Up to 8 frames may be extracted from each Full Dataset video, yielding 1,418,297 extracted Full Dataset images.

Figure 6:
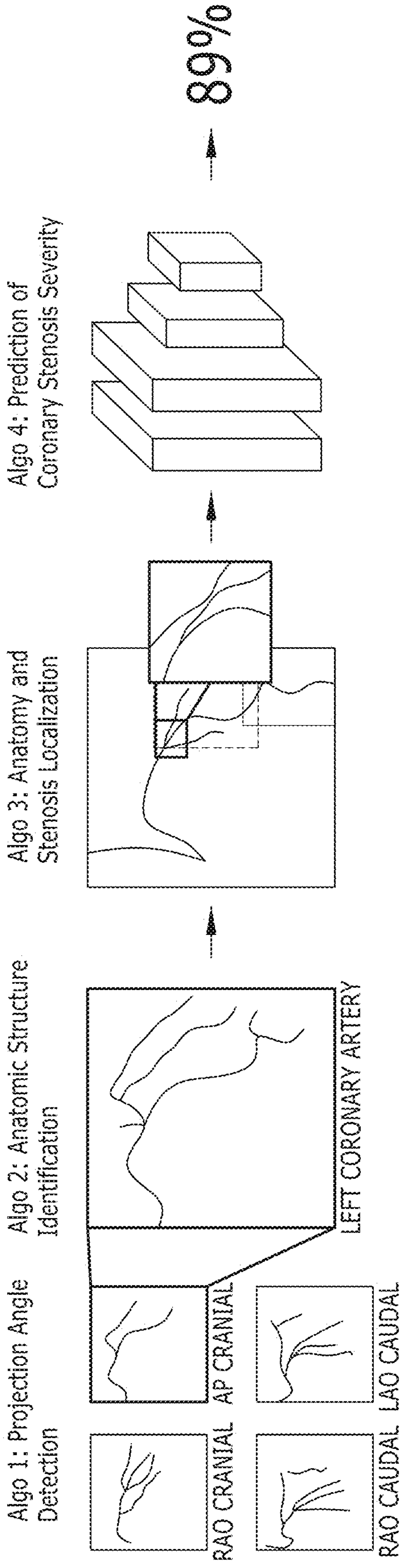
FIG. 6 illustrates a processing flow of an example coronary angiography input image in accordance with an embodiment of the invention.

FIG. 6 illustrates a processing flow of an example coronary angiography input image in accordance with an embodiment of the invention. The angiographic image is of a left anterior descending artery with severe stenosis (in the proximal to mid segment). Progression through each algorithm of the automated angiographic interpretation pipeline is illustrated. First, Algorithm 1 predicts the angiographic projection angle of the image. Algorithm 2 then identifies that the left coronary artery is present. Algorithm 3 then localizes objects or features in the image by predicting bounding boxes around objects, including coronary segments and stenoses. The bounding boxes may then be used to crop images around coronary artery stenoses to the nearest of three image sizes (aspect ratios) to enable input into Algorithm 4. Algorithm 4 provides an estimation of the stenosis severity. In some embodiments, multiple consecutive video frames of an angiogram may be used as the input during training and estimating rather than a single image.

Classification of Angiographic Projection Angle

In some embodiments, Algorithm 1 may take individual images as its input and identify the angiographic projection used. The projection may refer to the fluoroscopic angulation used to obtain the image, commonly described as LAO cranial, RAO caudal, etc. images which may be extracted during the pre-processing step and labeled using the primary and secondary angles extracted from each video's metadata, into 12 classes of angiographic projections (described in the Table 1 below). Angles may be extracted as two continuous variables ranging between −180 and 180 degrees for the primary angle and −50 and 50 degrees for the secondary angle. The Full Dataset may include 1,418,297 images from 11,972 patients and 195,195 videos for identifying angiographic projection divided into Training/Development/Test sets (e.g. 990,082 images in Training, 128,590 images in Development and 299,625 images in Test).

In some embodiments, the algorithm architecture may be XceptionNet, which is a convolution neural network that has achieved state-of-the-art performance at image recognition tasks. The convolution neural network may be initialized with 'ImageNet' weights, a previously described dataset of 1.3 million labelled images, which is often used in computer vision to initialize weights for faster algorithm convergence when the goal of the algorithm is to perform image classification, such as in this case. Images may be augmented by random zoom (e.g. range: 0.2) and shear rotate (e.g. range: 0.2). In some embodiments, all the layers of XceptionNet may be trained with the dataset. The Training dataset may be used to update the algorithm weights, the Development dataset may be used to measure the different algorithm performance and fine tune the hyperparameters using grid search, and the Test dataset may be used for the algorithm performance. In some embodiments, other architectures may be used such as VGG-16, ResNet50 and InceptionNet. In some embodiments, the learning rate may be 10e-2; 10e-3; or 10e-4. In some embodiments, the early stopping criteria may be 4, 8, or 16. In some embodiments, the optimizer may be Adam or RAdam.

In some embodiments, Algorithm 1 may be trained to identify the angiographic projection angle used in a given image, and may be based on the XceptionNet architecture. The left-right and cranio-caudal projection angles recorded in metadata for each video may be grouped into 12 distinct categories providing training data for Algorithm 1. These distinct categories are illustrated in Table 1:

| Class | Definition |
|---|---|
| Right Anterior Oblique Cranial | −45° to −15° Left Anterior Oblique; 15° to 45° Cranial |
| Antero-posterior Cranial | −15° to 15° Antero-posterior; 15° to 45° Cranial |

-continued

| Class | Definition |
|---|---|
| Left Anterior Oblique Cranial | 15° to 45° Left Anterior Oblique; 15° to 45° Cranial |
| Right Anterior Oblique Straight | −45° to −15° Right Anterior Oblique; −15° to 15° Antero-posterior |
| Antero-posterior | −15° to 15° Antero-posterior; −15° to 15° Antero-posterior |
| Right Anterior Oblique Caudal | −45° to −15° Right Anterior Oblique; −45° to −15° Caudal |
| Antero-posterior Caudal | −15° to 15° Antero-posterior; −45° to −15° Caudal |
| Left Anterior Oblique Caudal | 15° to 45° Left Anterior Oblique; −45° to −15° Caudal |
| Left Anterior Oblique Straight | 15° to 45° Left Anterior Oblique; −15° to 15° Antero-posterior |
| Left Anterior Oblique Lateral | 70° to 110° Left Anterior Oblique; −15° to 15° Antero-posterior |
| Right Anterior Oblique Lateral | −110° to −70° Left Anterior Oblique; −15° to 15° Antero-posterior |
| Other | Any angles not belonging to the previous definitions |

Extracted Full Dataset images may be divided into training (990,082), development (128,590), and test datasets (299,625). In Algorithm 1's hold-out test dataset, overall frequency-weighted precision, sensitivity and F1 score may be 0.90 for each. Performance may be worse in the less commonly used antero-posterior and Right Anterior Oblique lateral projections. In some examples, Algorithm 1 performed poorly on the heterogeneous "other" class, which consisted of any image that may not be a member of other listed classes. Once trained, Algorithm 1 may be applied to all 1,418,297 images extracted from Full Dataset videos which may then be flowed into Algorithm 2. In some embodiments, Algorithm 1 and Algorithm 2 may be performed separately (e.g. Algorithm 2 may be performed first and then Algorithm 1 or Algorithm 1 and Algorithm 2 may be performed simultaneously). The predicted angiographic projection for a video may be the most common prediction across all of its extracted frames. Ties may be addressed by selecting the projection with the highest average probability across all frames.

Classification of Primary Anatomic Structure

In some embodiments, Algorithm 2 may identify the main 'anatomical structure' present in an image, among 11 possible classes. 14,366 randomly selected images may be extracted from videos in a pre-processing step, then a cardiologist may label each image in one of 11 classes. The possible classes are identified in Table 2:

| Class | Definition |
|---|---|
| Left coronary artery | Artery that arises from the aorta above the left cusp of the aortic valve |
| Right coronary artery | Artery that arises from the aorta above the right cusp of the aortic valve |
| Bypass Graft | Venous graft, internal mammary graft or radial graft |
| Catheter | Any guiding catheter or diagnostic catheter without any other underlying structure |
| Pigtail Catheter | Pigtail catheter without any other underlying structure |
| Left ventricle | Ventricle, as delimited during ventriculography |
| Aorta | Ascending aorta, the arch or descending aorta, as delimited during aortography |
| Radial Artery | Major artery in the forearm |
| Femoral Artery | Either the superficial, deep or common femoral artery |
| Other | Any images not belonging to the other classes (for example, kidneys, pacemaker, etc.) |

The dataset may be split into Training sets, Development sets, and Testing sets (e.g. 70%-9,887 training images/10%-1,504 development images/20%-2,975 testing images). Algorithm 2 may be trained by initializing the weights using the XceptionNet architecture and/or weights from the trained Algorithm 1. Images may be augmented by random zoom (range was 0.2) and shear rotate (range was 0.2). The algorithm may be tuned using the same hyperparameters as for Algorithm 1. Other architectures may be used such as VGG-16, ResNet50 and InceptionNet. In some embodiments, the learning rate may be 10e-2; 10e-3; or 10e-4. In some embodiments, the early stopping criteria may be 4, 8, or 16. In some embodiments, the optimizer may be Adam or RAdam.

In some embodiments, to obtain video-level labelling of the cardiac structure present, the main anatomical structure may be predicted on individual frames of videos from the Full Dataset. Then, the probability may be averaged for the anatomical structure across each of the 7 frames containing the coronary, extracted from each video. In some embodiments, the frame in the first position which does not contain the artery may be excluded. In some embodiments, the anatomical structure may be extracted from the output of the softmax layer. Each video may be labelled according to the mode of the anatomical structure present in the 7 frames. Then, only videos where a right or left coronary artery was identified may be kept for subsequent analyses (e.g. Algorithm 3). For training both Algorithm 1 and Algorithm 2, grid-search may be used to tune hyperparameters, searching for the best optimizer, architecture, learning rate, batch size and the early stopping criteria in the development dataset.

In some embodiments, Algorithm 2 identifies the primary anatomic structure present in an angiographic video, enabling the coronary angiography interpretation pipeline to focus subsequent analysis on videos containing coronary arteries. Videos containing non-cardiac anatomic structures such as the aorta or the femoral artery may be captured during a coronary angiography procedure. Algorithm 2 may be based on the XceptionNet architecture and/or its weights may be initialized from Algorithm 1. Training data for Algorithm 2 may be generated by manually classifying 14,366 angiographic images randomly selected from the extracted Full Dataset images into 11 classes describing the primary anatomic structure in the image. In some embodiments, the number of classes may be adapted based on the situation. In some embodiments, the Full Dataset images may be divided into 9,887 training datasets, 1,504 development datasets, and 2,975 test datasets. For each input image, Algorithm 2 may output a score predicting the primary anatomic structure contained, and scores from all images from the same video may be averaged to predict the primary anatomic structure in the video. In some examples, Algorithm 2's weighted average precision, sensitivity, and F1 score may be 0.89 for each. F1 score performance may vary by anatomic class, but in general, classes with lesser frames may have lower performance. In some embodiments, improved performance may be obtained with more available labeled data. Exceptions to this may be ventriculography or aortography classes, which may perform well since they may be highly visually distinct from other classes. Algorithm 2 may be particularly useful in identifying the left and right coronary arteries. Sensitivity of 0.94 and 0.93 may be achieved for left and right coronary arteries, respectively. Once trained, Algorithm 2 may be deployed on all contrast-containing extracted Full Dataset images to identify videos primarily containing the left and right coronary artery to flow into Algorithm 3.

Localization of Relevant Objects

In various embodiments in accordance with the invention, Algorithm 3 may use frames from the left and right coronary artery videos as its input. The left and right coronary artery videos may be extracted from the output of Algorithm 2. Algorithm 3 may perform at least one of (i) identify anatomic coronary artery segments (e.g. proximal left anterior descending artery), (ii) identify stenosis (if present) and/or (iii) localize additional angiographically relevant objects such as interventional guidewires or sternal wires. In some embodiments, Algorithm 3 may be trained or validated by labeling 2,338 images of left and right coronary arteries that were healthy or diseased. In some embodiments, Two versions of Algorithm 3 may be trained, Algorithm 3a and 3b. Algorithm 3a may focus on left and right coronary arteries and Algorithm 3b may focus on the right coronary artery in LAO projection. In some embodiments, the labelled images may be split for this task into two separate datasets: one containing left/right coronary arteries (e.g. 2,338 images) and one containing right coronary arteries in the straight LAO projection (e.g. 450 images). Each dataset may be subsequently split into 90% training images (e.g. 2104 and 405 images respectively) and 10% test images (e.g. 234 and 45 images respectively). In some embodiments, Algorithm 3 may only localize stenoses in the main epicardial vessel and not side branches (such as diagonals or marginals). Algorithm 3a may be trained by manually labeling 2,338 images with 12,685 different classes and Algorithm 3a may be trained for 50 epochs. Algorithm 3b may be trained by manually labeling 450 images with 2,447 different classes and Algorithm 3b may be trained for 50 epochs.

The Algorithm 3a or 3b may use the RetinaNet architecture and may be trained using hyperparameters. RetinaNet may achieve state-of-the-art performance for object localization such as the pedestrian detection for self-driving cars and in medicine, may be used to localize and classify pulmonary nodules in lung CT-scans. Algorithms 3a and 3b output stenoses and coronary artery segments along with their coordinates on an image. The predicted coordinates may be compared with the annotated coordinates using the ratio of the area of overlap over the area of union (called Intersect-over-union [IoU]). An IoU≥0.5 between the predicted and annotated coordinates may be considered a true positive. Next, the mean average precision (mAP) may be measured, which represents the ratio of true positives over true and false positives at different thresholds of IoU, for each class. A mAP of 50% may compare with state-of-the-art results for this type of task.

In some embodiments, Algorithm 3 localized relevant objects within angiogram images containing left and right coronary arteries, including coronary artery sub-segments and stenoses. Algorithm 3 may be based upon the RetinaNet architecture which localizes target objects by predicting surrounding bounding boxes. To train Algorithm 3, pea contrast frames from a random selection of Full Dataset videos (e.g. 1126 frames of the left coronary artery and 462 frames of the right coronary artery) may be manually labeled by placing bounding boxes around the 11 dominant coronary artery segments (per SYNTAX28), coronary stenoses, and/or other objects. The classes of labels are described in Table 3a:

| Class | Definition |
|---|---|
| Coronary segment | |
| Proximal RCA* | From ostium to one half the distance to the acute margin of the heart. |
| Middle RCA* | From end of first segment to acute margin of heart. |
| Distal RCA* | From the acute margin of the heart to the origin of the posterior descending artery. |
| Posterior descending artery* | Artery running the posterior interventricular groove. |
| Posterolateral artery* | Posterolateral branch originating from the distal coronary artery distal to the crux. If left posterolateral, it was chosen as the artery running to the posterolateral surface of the left ventricle. |
| Left main artery* | From the ostium of the LCA through bifurcation into left anterior descending and left circumflex branches. |
| Proximal LAD* | Vessel between left main and proximal to and including the first septal |
| Middle LAD* | LAD immediately distal to the origin of first septal branch and extending to the point where the LAD forms an angle (RAO projection). If angle is not identifiable, this segment ends at one half the distance form the first septal and the apex of the heart |
| Distal LAD* | Terminal portion of LAD, beginning at the end of previous segment and extending to or beyond the apex. |
| Proximal LCX* | Main stem of circumflex from its origin of left main to and including origin of first obtuse marginal branch. |
| Distal LCX* | The stem of the circumflex distal to the origin of the most distal obtuse marginal branch and running along the posterior left atrioventricular grooves. Caliber may be small or artery absent. |
| Other classes | |
| Valve | Presence of a mechanical valve, annuloplasty or valvular calcifications |
| Catheter | Presence of a catheter, such as a diagnostic catheter, pigtail or guiding catheter |
| Sternotomy | Presence of sternotomy wires |
| Stent | Stent landmarks on a guidewire or in a vessel |
| Pacemaker | Presence of a pacemaker or pacemaker lead |
| Guidewire | Presence of a guide wire |
| Stenosis | Any visible stenosis that is also described in the cath report. |
| Obstruction | 100% obstruction of an artery, either by thrombus or chronically occluded. Defined by a blunt stump at the end to a vessel or by the 'absence' of contrast in between two healthy vessel segments with bridging collaterals. |

The abbreviations for each of these are as follows: RCA: Right Coronary Artery; LAD: Left Anterior Descending Artery; LCX: Left Circumflex. In some embodiments, two versions of Algorithm 3 may be used: Algorithm 3a may accept both left and right coronary artery images as input, whereas Algorithm 3b may only take right coronary artery images in the LAO projection as input. Because this projection contained the most annotated images, Algorithm 3b may examine possible performance gains achievable by focusing the algorithm on a specific angiographic projection. In some embodiments, input variability may be decreased into Algorithm 3a since all Right Coronary Artery LAO images may be processed by Algorithm 3b, which resulted in performance improvements for both Algorithm 3a and 3b. Algorithms 3a and/or 3b may be trained using the original described RetinaNet hyperparameters. In some embodiments, a post-hoc heuristic may exclude Algorithm 3a and 3b predicted artery segments for certain angiographic projections which are known a-priori to be not visible or foreshortened. These angiographic projections may yield false results and thus it may be advantageous to exclude results with certain angiographic projections. The angiographic projections may be the angiographic projections classified by Algorithm 1. In some embodiments, there are certain objects that should not be seen at certain projection angles and thus labels for these objects may be filtered out.

Example of the excluded predicted artery segments are included in the below Table 3b:

| | Excluded segments | |
|---|---|---|
| Projection | Right Coronary Artery | Left Coronary Artery |
| RAO Cranial | None | Proximal LCx, Distal LCx |
| AP Cranial | None | Proximal LCx, Distal LCx |
| LAO Cranial | None | Proximal LCx, Distal LCx |
| RAO Straight | Proximal RCA | Proximal LAD |
| AP | None | Mid LAD, Distal LAD, Distal LCx |
| RAO Caudal | None | Mid LAD, Distal LAD |
| AP Caudal | None | Distal LAD |
| LAO Caudal | None | Mid LAD, Distal LAD |
| LAO Straight | None | Proximal LCx, Distal LCx |
| LAO Lateral | None | None |
| RAO Lateral | None | None |
| Other | None | None |

In some embodiments, the performance of Algorithm 3a/3b may be assessed by measuring the area of intersection over the area of union (IoU) between predicted bounding-box coordinates and the expert-annotated bounding-box coordinates of objects in each class in the test dataset. An IoU≥0.5 signifies at least 50% overlap between the predicted and true bounding-boxes, which may be considered a true positive. Second, the mean average precision (mAP) metric may be measured which may represent the ratio of true positives over true and false positives at different thresholds of IoU, for every class. A value of 50% compares with state-of-the-art results for this type of task. In the hold-out test dataset at the image-level, Algorithm 3a may exhibit a 48.1% weighted average mAP. The mAP may be 37.0% for left coronary segments, 42.8% for right coronary artery segments, and 13.7% for stenosis. Algorithm 3b may exhibit a weighted average mAP of 58.1%; average mAP of 54.5% for right coronary artery segments and average mAP of 26.0% for stenosis. Once trained, Algorithms 3a/3b may be deployed on all images from videos primarily containing Left or Right Coronary arteries, as determined by Algorithm 2. In some embodiments, the location of any identified coronary stenosis may be assigned to the coronary artery sub-segment whose bounding box exhibited maximal overlap (by intersection over union) with a coronary stenosis bounding box.

In some embodiments, the automated angiographic interpretation pipeline may conform with standard cardiologist practice and AHA/ACC guideline recommendations. The automated angiographic interpretation may assess coronary stenosis severity at any artery location as seen in the "worst view" from all angiographic videos that visualize that stenosis. Therefore, Algorithm 3 may identify stenoses by aggregating predictions from all images that visualized an artery segment across multiple videos (artery-level), compared against stenoses described in a procedural report. In some embodiments, Algorithm 3a and 3b may identify 68.2% of stenoses (e.g. 6,667 of 9,782) that may be described in procedural reports, among those angiographic studies that had matching procedural reports. These 6,667 stenoses may be identified across 105,014 frames. There may be better localization of right versus left coronary artery stenoses (e.g. 70.6% vs 65.8% respectively; $p<0.005$).

Prediction of Stenosis Severity

In various embodiments in accordance with methods and system of the invention, Algorithm 4 may predict the percentage of coronary artery stenosis. In some embodiments, each video may be matched with a clinical angiographic report associated with that study, constituting the "Report Dataset". Then, Algorithm 3a and Algorithm 3b was run across this dataset to identify coronary artery segments and localize stenoses. As described above, Algorithm 3a may be run on all images not meeting the criteria for input into Algorithm 3b. Algorithm 3b may be run on all images labelled as right coronary artery in LAO projection which may be determined by Algorithm 1 and Algorithm 2. Each frame containing a stenosis bounding box with an intersection-over-union ≥0.20 with the underlying artery segment bounding box may be recorded. The overlap intersection between a stenosis and an artery segment, as identified by Algorithm 3a or 3b, may be used to assign a stenosis to an artery segment (e.g. if a stenosis overlapped the mid-RCA as measured by the IoU, then that stenosis was assigned to the mid-RCA). As discussed above, certain coronary segments may be hidden or foreshortened in certain angiographic projections and thus may be excluded from the different views. Afterwards, stenoses found by Algorithm 3a and/or 3b may be cross-matched with the stenosis percentage found in the procedural report. If a matching stenosis percentage is found in the artery segment, as extracted from the procedural report, that percentage may be assigned to the image of the stenosis identified by Algorithm 3a and/or 3b and this may be used to train Algorithm 4. Non-matched stenoses may be removed from the dataset. In some embodiments, videos where an intracoronary guidewire is present in more than 4 frames may be excluded, since these could represent a stenting procedure which may lead to a modification in the stenosis percentage due to the angioplasty and subsequent labelling errors. In some embodiments, videos of these procedures prior to the insertion of an intracoronary guidewire may be separately kept.

In some embodiments, once a stenosis is identified, the bounding box coordinates may be expanded by 12 px. The images may be cropped and resized to multiple predetermined sizes. For example, three predetermined sizes may be used: 256*256 pixels (aspect ratio no. 1), 256*128 pixels (aspect ratio no. 2), and 128*256 pixels (aspect ratio no. 3). Predetermined sizes may maximize signal-to-noise (vessel-to-background) ratio, due to the different vessel orientations and sizes of the stenosis. The "Report Dataset" used for Algorithm 4 may consist of 105,014 images (6,667 lesions coming from 2,736 patients and 5,134 healthy vessel segments from 1,160 patients). Since healthy vessel segments can be longer than focal stenosis which could bias the training, all healthy segments may be cropped randomly to a height and width that followed the distribution of the sizes of the stenoses in that coronary segment. This may create uniform vessel sizes between the stenotic and healthy counterparts for each vessel segment. This, may allow Algorithm 4 to learn features of healthy vessels as well as diseased ones. Images in the dataset may be split into three groups: Training, Development, and Testing. In some embodiments, the makeup of each group may be 70% Training, 10% Development and 20% in Testing.

In some embodiments, Algorithm 4 may be based on a modified XceptionNet architecture where the last layer (e.g. Softmax layer, used for classification) may be removed and replaced with an 'average pool' layer. A dense layer with a linear activation function may be included to enable prediction of stenosis severity as a continuous percentage value. Furthermore, image metadata may include the coronary artery segment label and cropped aspect ratio which may be added as inputs to the final layer of Algorithm 4. Algorithm 4 may output a percentage stenosis value between 0 and 100 for every segmented stenosis input and learn from stenoses localized in different coronary artery segments. In some embodiments, model weights may be initialized using those from the trained Algorithm 1. Images may be augmented by random flip (both horizontal and vertical), random contrast, gamma and brightness variations, random application of CLAHE (To improve contrast in images). In some embodiments, a one-hot encoded vector input containing information about the coronary segment prior and the aspect ratio category may be added to the dense layer, so that Algorithm 4 may learn characteristics specific to each vessel segment and each aspect ratio. The algorithms may be trained to minimize the squared loss between the automatically estimated stenosis and the manually estimated stenosis using RADAM Lookahead as an optimizer with an initial learning rate of 0.001, momentum of 0.9, and batch size of 12, for 50 epochs. In some embodiments, training may be halted once the loss function stopped improving for 8 consecutive epochs in the test dataset. Image metadata including the coronary artery segment and the cropped aspect ratio may be added as additional inputs into Algorithm 4.

In some embodiments, training may be performed using different stenosis datasets. For example, the training data may be pre-processed differently, such as non-segmented stenoses or zero padded stenosis without resizing, include varying the input image size, include stenoses resized to different sizes, and/or include using up the index frame and adjacent frames as input. However, increased complexity training data may increase complexity in the computational tasks without gains in estimation accuracy. Examples of different hyperparameters are illustrated in Table 4:

| Parameters | Values |
| --- | --- |
| Learning Rate | 10e−2; 10e−3; 10e−4 |
| Architecture | XceptionNet with additional inputs: 'image size' |
| | XceptionNet with additional inputs: 'image size', 'artery segment' |
| | XceptionNet with additional inputs: 'image size', 'artery segment', 'angiographic projection' |
| | XceptionNet |
| | InceptionNet |
| | ResNet50 |
| | VGG16 |
| Early stopping criteria | 4, 8, 16 |
| Optimizer | Adam |
| | RAdam |
| Lookahead | True |
| | False |
| Preprocessing | 1. Rotation, horizontal flipping and vertical flipping |
| | 2. Rotation, horizontal flipping and vertical flipping, contrast and brightness adjustment |
| | 3. Rotation, horizontal flipping and vertical flipping, contrast and brightness adjustment, scaling, shearing and random cropping |
| Datasets | 1. Stenoses bounding boxes |
| | 2. Stenoses bounding boxes expanding by 12 pixels |
| | 3. Stenoses bounding boxes resized to a fixed 256 × 256 size |
| | 4. Stenoses bounding boxes centered in a 256 × 256 image, with zero-padded borders |
| | 5. Segmented stenoses |

As described previously, in some embodiments, Algorithm 4 may use the three aspect ratios of cropped images of coronary arteries with and without stenosis as its input, to predict the degree of stenosis in the image. In some embodiments, for Algorithm 4, each full epoch may be trained on one aspect ratio, then switch to the other aspect ratio size for the next full epoch. In some embodiments, each subsequent epoch may copy all weights from the previous epoch. In some embodiments, the aspect ratio size may be iterated until convergence. Algorithm 4 performance may be measured on the whole test dataset, including the three aspect ratios. The convergence of the multi-size input training may be similar to other algorithms that use a fixed aspect ratio size for training. In addition, this type of training may be performed in the past in other deep learning networks using multi-size inputs.

For all algorithms, the data may be split into Training data, Development data, and Test data. The split may be as follows: Training (70%), Development (10%) and Test (20%) datasets, each containing non-overlapping patients. The development dataset may be used for algorithm tuning. For Algorithm 3, the dataset splits may be Training (80%) and Test (20%); since hyperparameters may be used as described and additional Algorithm 3 tuning may not be performed.

In some embodiments, once coronary artery segments and stenoses were identified by Algorithm 3a and/or 3b, the severity of identified coronary stenoses may be estimated. Procedure reports may be used as training data which may contain the cardiologist-interpretation of angiographic studies from Jan. 1, 2013 to Dec. 31, 2019. These reports may be matched with their corresponding angiographic studies from the Full Dataset to derive the Report Dataset. Example results from Algorithm 3a and 3b may identify 4,328 Report Dataset angiograms with stenoses from 3,721 patients, totaling 46,168 videos. The procedure report text from these studies may be parsed to identify any description of coronary stenosis, the maximal stenosis percentage, and the corresponding location in one of 12 coronary artery segments. By doing this, 9,122 coronary artery segments may be identified within the reported images including stenoses and 10,088 non-stenosed artery segments (derived from 2,538 non-stenosed full coronary arteries). The reported images including stenoses may include a stenosis percentage and the corresponding artery images which may be used to train Algorithm 4.

In some embodiments, the training data may be using 1257 exams coming from 916 patients where each coronary stenosis was annotated by two experts in a core lab, using quantitative coronary angiography (QCA). As discussed previously, QCA is a highly accurate method for assessment of coronary stenoses using coronary angiograms. The QCA may include a cutoff. When using a QCA cutoff of 50% to determine a severe from a non-severe stenosis, as is commonly done in this setting, the method achieved a result of AUC-ROC of 0.73 discriminating between severe and non-severe stenoses. While this performance was lower than in the two external datasets where manual visual assessment of stenoses was used, the algorithm may be able to generalize to datasets where the stenosis was obtained using QCA as opposed to the clinical standard of visual assessment, without further re-training of the algorithm.

In some embodiments, Algorithm 4 may be trained to predict the maximum stenosis severity contained in input images cropped around artery segments from the Report Dataset, and may be based on a modified XceptionNet architecture. Bounding boxes from Algorithm 3 may be used to crop images around stenosed artery segments and non-stenosed arteries, and used to train Algorithm 4. Algorithm 4's output score from 0-1 may be converted to an automatically estimated stenosis percentage from 0-100%. The threshold for binary prediction may be 70% stenosis and may be chosen to optimize the F1 score. Since the bounding boxes used to crop images varied in size, they may be resized to the closest of three defined aspect ratios before being input into Algorithm 4.

In some examples, in the Test dataset, Algorithm 4's AUC may be 0.862 (95% Cl: 0.843-0.880) to predict "obstructive" coronary artery stenosis, defined as ≥70% stenosis, at the artery-level. AUC may be 0.814 (95% Cl: 0.797-0.831) at the video-level and 0.757 (95% Cl: 0.749-0.765) at the image-level. In some examples, of those that had <70% estimated stenosis, Algorithm 4 may identify 78.1% correctly (using the F1 score-optimized binary threshold of 0.54; 95% Cl:76.1-80.1%; 1082/1385). Of those ≥70% stenosed by the estimated stenosis, Algorithm 4 may identify 74.5% correctly (95% Cl: 70.0-78.4%; 260/349). When Algorithm 4's sensitivity to detect obstructive coronary stenosis may be fixed at 80.0%, its specificity to detect obstructive stenosis may be 74.1%. When Algorithm 4's specificity is fixed at 80.0%, its sensitivity to detect obstructive stenosis may be 71.6%. In some examples, the mean absolute percentage difference between the automatically estimated stenosis and manually estimated stenosis may be 17.9±15.5% at the artery-level, 18.8±15.8% at the video-level, and 19.2±15.1% at the frame level. In some examples, there may be a significantly lower artery-level mean absolute percentage difference for the right coronary versus the left coronary artery (16.4±15.0 vs 19.0±15.8; p<0.001), at similar training dataset sizes-likely reflecting the right coronary artery exhibiting less anatomic variation than the left. At the artery level, there may be medium-to-strong Pearson and intra-class correlations between the automatically estimated stenosis and manually estimated stenoses values. In some embodiments, Algorithm 4 may overestimate milder stenoses and underestimate more severe stenoses. In some embodiments, there may only be minor differences in performance between anatomic coronary artery segments, though mid vessels, which may have lower mean squared error and absolute difference compared to proximal or distal vessels.

In some embodiments, patients may be determined to have obstructive stenoses (</≥70%) based upon automatically estimated stenoses that were either concordant (1,336) or discordant (398) based on manually estimated stenoses. In some embodiments, automatically estimated stenosis may be more likely to be discordant with manually estimated stenosis in older patients (e.g. 62.7±13.2 vs 65.1±12.3, <0.001), in the left coronary artery, the proximal RCA, distal RCA, the right posterolateral, and the distal LAD.

Embodiments Including Alternative Approaches to Estimating Stenosis Severity

In addition to Algorithm 4, an alternative approach to estimating stenosis severity may be performed such as a sensitivity analysis. This sensitivity analysis may serve to corroborate the ability of Algorithm 4 to predict stenosis using cropped angiogram images, while also providing an alternative approach that may perform better in some settings. In some embodiments, this approach includes Algorithm 5 to segment the boundaries of the coronary artery within a cropped input image (e.g. the output of Algorithm 3) and exclude all background information by setting non-artery pixel values to 0 (called the "Segmented image"); Algorithm 6 then predicts the percentage of stenosis from Algorithm 5's segmented images (similar to Algorithm 4).

In some embodiments, Algorithm 5 may use the cropped images of coronary artery stenosis (from Algorithm 3) and may perform segmentation of the coronary artery in these images, which are then fed into Algorithm 6. This serves as a parallel, alternative approach to predicting the degree of coronary artery stenosis. The segmentation Algorithm 5 may classify each individual 'pixels' within a coronary artery-containing image into 'vessel' or 'non-vessel' pixels (also may be called "pixel-wise segmentation"). In some embodiments, the vessel from the background may be isolated, to minimize background noise in the estimation of stenosis. Thus, the non-vessel pixels may be omitted. To do so, all stenosis and healthy artery segments may be extracted as described above, respecting the three aspect ratios. Then, to generate the dataset used for Algorithm 5 training, a cardiologist may trace the vessel contour of 160 images of stenoses and 40 images of healthy coronary segments to generate 'vessel masks' used for training. Annotated Algorithm 5 data may be then divided into 90% training and 10% test datasets.

In some embodiments, to perform this segmentation task, a Generative Adversarial Network may be used. The Generative Adversarial Network may perform automatic retinal vessel segmentation using small datasets (less than 40 images for training). As discussed above, it may be advantageous to use a finite number of aspect ratios. For example, three separate algorithms may be trained (Algorithms 5a/5b/5c), one for each of the predetermined sizes of the image (Aspect Ratio 1:120 images, Aspect Ratio 2:80 images, Aspect Ratio 3:80 images), using the default parameters. Each image may be normalized to the Z-score of each channel and augmented by left-right flip and rotation. The datasets may be split into 80% training and 20% test. The discriminator and the generator may be trained for successive epochs, alternatively, for up to 50,000 iterations. In some embodiments, Learning rate may be 2e-4, the optimizer may be 'ADAM', the GAN2SEGMENTATION loss may be 10:1 and the discriminator may be dataset to the 'image-level'. The performance of Algorithms 5a/5b/5c on the test dataset may be measured using the sum of the Area Under the Curve for the Receiver Operating Characteristic (ROC-AUC) and the Area Under the Curve for Precision and Recall Curve (PR-AUC). A value of 2.00 may represent perfect segmentation meaning that the mask generated by Algorithm 4 may be perfectly overlaps the human generated mask. The Dice coefficient may represent the area of overlap divided by the total pixels between the predicted vessel mask and the traced vessel mask. For the dice coefficient, the probability map may be thresholded with the Otsu threshold which may be used to separate foreground pixels from background pixels.

In some embodiments, Algorithm 6 may be a modified XceptionNet. Algorithm 6 may be trained similarly to, but separately from, Algorithm 4. Algorithm 6 took as input the same images as Algorithm 4 masked by the Algorithm 5 predicted vessel masks (discussed above). Due to the black-box nature of DNN algorithms, the Algorithm 5 and Algorithm 6 sensitivity analysis may also help determine whether background elements in the image spuriously contributed to Algorithm 4's automatic prediction.

In some examples, Algorithm 5 may demonstrate excellent segmentation performance on the test dataset. For example, the average DICE coefficient may be 0.79, AUC may be 0.88, AUC-PR may be 0.82, and an AUC-PR sum may be 1.71. Algorithm 5 may predict coronary artery boundaries from cropped input images, and may be trained by manually segmented "ground-truth" boundaries. Algorithm 5's predicted boundaries may be then used to mask coronary artery images, setting all non-vessel pixels to 0 (e.g. black). These resulting images may then be input into Algorithm 6 to predict stenosis percentage, trained using the same manually estimated stenosis as in Algorithm 4. In some examples, Algorithm 6 predicted stenosis may be strongly correlated with those from Algorithm 4 at the artery-level (e.g. r=0.70) in the test dataset. The average difference in predicted stenosis severity between Algorithm 4 and Algorithm 6 may be 12.4±10.9%, with 12.9±11.2% for right coronary arteries and 12.0±10.6% for left coronary arteries. Thus, Algorithm 4 performance may not substantially rely on image features outside of the coronary artery boundaries.

In some embodiments, besides cropping the stenoses, a dataset was developed using multiple aspect ratios (e.g. 256×256px, 128×256 px, and 256×128 px) to better account for the different variations in the vessel orientation. The multiple aspect ratios may be constant aspect ratios. The multiple aspect ratios may be multiple aspect ratios, e.g. 256×256px, 128×256 px, and 256×128 px. In some embodiments, the aspect ratio may be one of multiple aspect ratios depending on the different variation in a vessel orientation of the artery. the AI model may be trained to include multiple consecutive video frames of the cropped bounding box to give more data during training. In some embodiments, The multiple consecutive video frames may be three consecutive video frames. Training a convolutional neural network with three aspect ratios and/or three consecutive video frames may provide increased performance.

Once a stenosis is identified, bounding box coordinates may be expanded by 12 pixels in all dimensions, then cropped and resized to the nearest of three predetermined sizes, e.g. 256*256 pixels (aspect ratio no. 1), 256*128 pixels (aspect ratio no. 2), and 128*256 pixels (aspect ratio no. 3). Due to varying vessel orientations and stenosis sizes, utilizing multiple aspect ratios may maximize signal-to-noise ratio (e.g. vessel-to-background ratio).

Examples of Statistical Analysis

In some embodiments, final algorithm performance may be reported in the Test Dataset. In some embodiments, Algorithm 1 and Algorithm 2 results may be presented on the frame level. For each of these algorithms, class performance may be calculated using precision (e.g. positive predictive value) and recall (sensitivity) and the performance may be plotted using confusion matrices. An F1 score may be derived for each class, which may be the harmonic mean between the precision and recall. The F1 score may range between 0 and 1 and may be highest in algorithms that maximize both precision and recall of that class simultaneously.

To measure the performance of Algorithm 3a and 3b, the intersection-over-union (IoU) may be measured between the predicted coordinates and the actual coordinates on the test dataset. The IoU may be the ratio between the area of overlap over the area of union between the predicted and annotated sets of coordinates. The performance of Algorithm 3a and 3b may be reported as the mean average precision (mAP), which represents the ratio of true positives over true and false positives at different thresholds of IoU, starting from IoU of 0.5, with steps of 0.05, to a maximum IoU of 0.95, for each class. The mean average precision for Algorithm 3a and Algorithm 3b may be obtained by calculating the proportion of correct class prediction with an IoU≥0.5 with the ground-truth labelling across all the classes in the test dataset. For Algorithms 5a/5b/5c, the sum of the PR-AUC and the ROC-AUC may be obtained.

Algorithm 4 may be used to derive the average absolute error between the manually estimated stenosis and the automatically estimated stenosis, at the artery segment level. In some embodiments, the stenosis may be automatically estimated by estimating the stenosis in multiple orthogonal projections and reporting the final value in the projection demonstrating the narrowest level of luminal narrowing. To compute the artery-level automatically estimated stenosis, an automatically estimated stenosis may be first obtained for all frames where that stenosis may be localized (e.g. frame-level automatically estimated stenosis), then those values may be averaged across a video to obtain video-level automatically estimated stenosis. Then, the maximal video-level automatically estimated stenosis percentage may be kept to obtain an overall estimate of the artery-level stenosis percentage. Pearson correlation and Bland-Altman plots may be used to describe agreement between the manually estimated stenosis and automatically estimated stenosis at the video-level and artery-level. Intra-class correlation (ICC2,2) may be used to determine interobserver reliability. The interobserver reliability may be between the manually estimated stenosis and automatically estimated stenosis). The reliability level may be further classified as slight (0.0-0.20), fair (0.21-0.40), moderate (0.41-0.60), substantial (0.61-0.80), or excellent (0.81-1.0). Finally, the mean squared error may be presented between manually estimated stenosis and automatically estimated stenosis at the video-level.

As a sensitivity analysis, the automatically estimated stenosis and manually estimated stenosis may be divided into two groups (≥70% and <70%). The Algorithm 4 percentage outputs may be recalibrated, by obtaining the automatically estimated stenosis threshold maximizing the F1 score in the Test Dataset, ensuring optimal sensitivity and specificity for manually estimated stenosis of ≥70% and <70%. Then, the ROC-AUC may be calculated in the Test dataset and may be used to describe the performance of Algorithm 4 using the sensitivity, specificity and diagnostic odds-ratio, at the frame level, video level, and artery level, based on the cutoff. Confidence intervals for these performance metrics may be derived by bootstrapping 80% of the test data over 1000 iterations to obtain 5th and 95th percentile values. The performance of the algorithm stratified by the left and right coronary arteries may be presented by coronary segment and by age group. Automatically estimated stenosis and manually estimated stenosis may be categorized in concordant and discordant lesion groups based on the visual ≥70% cut off. For discordant lesions, the prevalence may be presented, stratified by coronary vessel segment. For lesion/vessel level data, a mixed effects logistic regression model may be used to account for within-subject correlation and for repeated angiograms.

The ICC may illustrate the influence of the background elements in the automatically estimated stenosis, Pearson, and the mean stenosis difference between the Algorithm 4 (e.g. taking vessels with the background as input) and Algorithm 6 (taking the segmented vessels, without their background)

For Algorithm 5, a separate version of the algorithm may be trained that instead of being used for regression, may be used for classification into ≥70% and <70% manually estimated stenosis to derive Saliency maps. To illustrate this, 5 images may be randomly selected of severe stenoses ≥70% from the test dataset and plotted their saliency maps.

Automatic Assessment of Left Ventricular Ejection Fraction Using Coronary Angiograms In various embodiments of systems and methods in accordance with the invention, an automatic assessment of left ventricular ejection fraction (LVEF) using a general coronary angiogram may be performed. LVEF may not typically be estimated through a general coronary angiogram. A coronary angiogram where large amounts of dye are injected directly into the heart may be used to estimate LVEF. However, injecting dye directly into the heart such may be harmful to the patient and should be avoided. Further, LVEF may be estimated using a TTE however this would require another procedure to estimate LVEF. Also, a TTE may not be able to estimate LVEF values with a high degree of accuracy. Continuous LVEF values may be values of LVEF ranging between 5% and 70% whereas dichotomous LVEF values may be values of LVEF less than or equal to 40% or greater than 40%. The dichotomous LVEF values may only measure whether the LVEF percentage is beyond a certain LVEF threshold. A 40% LVEF threshold may be used to determine the presence of clinically significant cardiomyopathy. Other LVEF thresholds may be used. In some embodiments, the automatic assessment of LVEF using the general coronary angiogram may be able to estimate both continuous LVEF values and dichotomous LVEF with a high degree of accuracy.

The automatic assessment may include use of a Full Dataset. The Full Dataset may include retrospective, de-identified coronary angiographic studies from all patients 18 years or greater from the University of California, San Francisco (UCSF), between Dec. 12, 2012 and Dec. 31, 2019 that also had a TTE performed either 3 months before or up to 1 month after the Coronary angiogram. Coronary angiograms may be acquired with Philips (Koninklijke Philips N.V., Amsterdam, Netherlands) and Siemens (Siemens Healthineers, Forchheim, Germany) systems. TTEs may be acquired by skilled sonographers using ultrasound machines and the processed images may be stored in a Philips Xcelera picture archiving system. In some embodiments, an estimated LVEF percentage and corresponding general angiogram images may be used to train a machine learning algorithm. In some embodiments, the estimated LVEF percentage may be obtained from TTE or left ventricular angiography.

Figure 7:
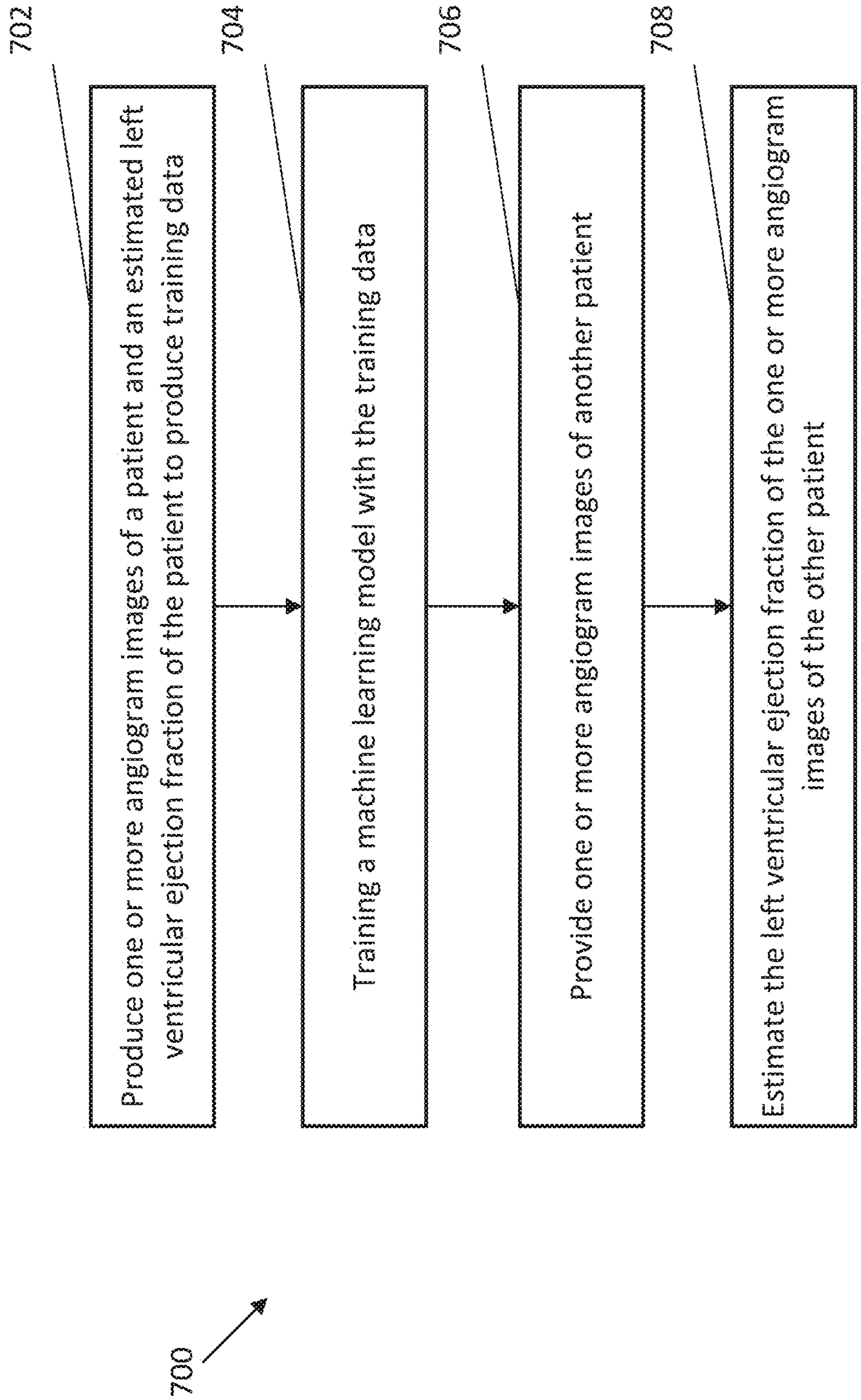
FIG. 7 illustrates a flow chart of an example automatic assessment of LVEF using a general coronary angiogram in accordance with an embodiment of the invention.

FIG. 7 illustrates a flow chart of an example automatic assessment of LVEF using a general coronary angiogram in accordance with an embodiment of the invention. The method 700 includes producing (702) one or more angiogram images of a patient and an estimate of LVEF of the patient to produce training data. The method 700 further includes training (704) a machine learning model with the training data. The method 700 further includes providing (706) one or more angiogram images of another patient. Finally, the method 700 further includes estimating (708) the LVEF of the one or more angiogram images of the other patient using the trained machine learning model.

Advantageously, the one or more angiogram images of the patient and the other patient may be normal angiogram images without dye injected directly into the patient's aorta or ventricle. In some embodiments, the method 700 may further include classifying the projection angle of the angiogram image. Only angiogram images of certain projection angles may be used to produce the training data and may be used to estimate the LVEF. In some embodiments, the method 700 may further include classifying the primary anatomic structure of the one or more angiogram images of the patient and the other patient. Only angiogram images classified as a left coronary artery may be used to produce the training data and may be used to estimate the LVEF. In some embodiments, only angiogram image of a certain projection angle and classified as left coronary artery may be used to produce the training data and may be used to estimate the LVEF. Filtering the angiogram images utilized may provide a more accurate estimate of LVEF.

Figure 8:
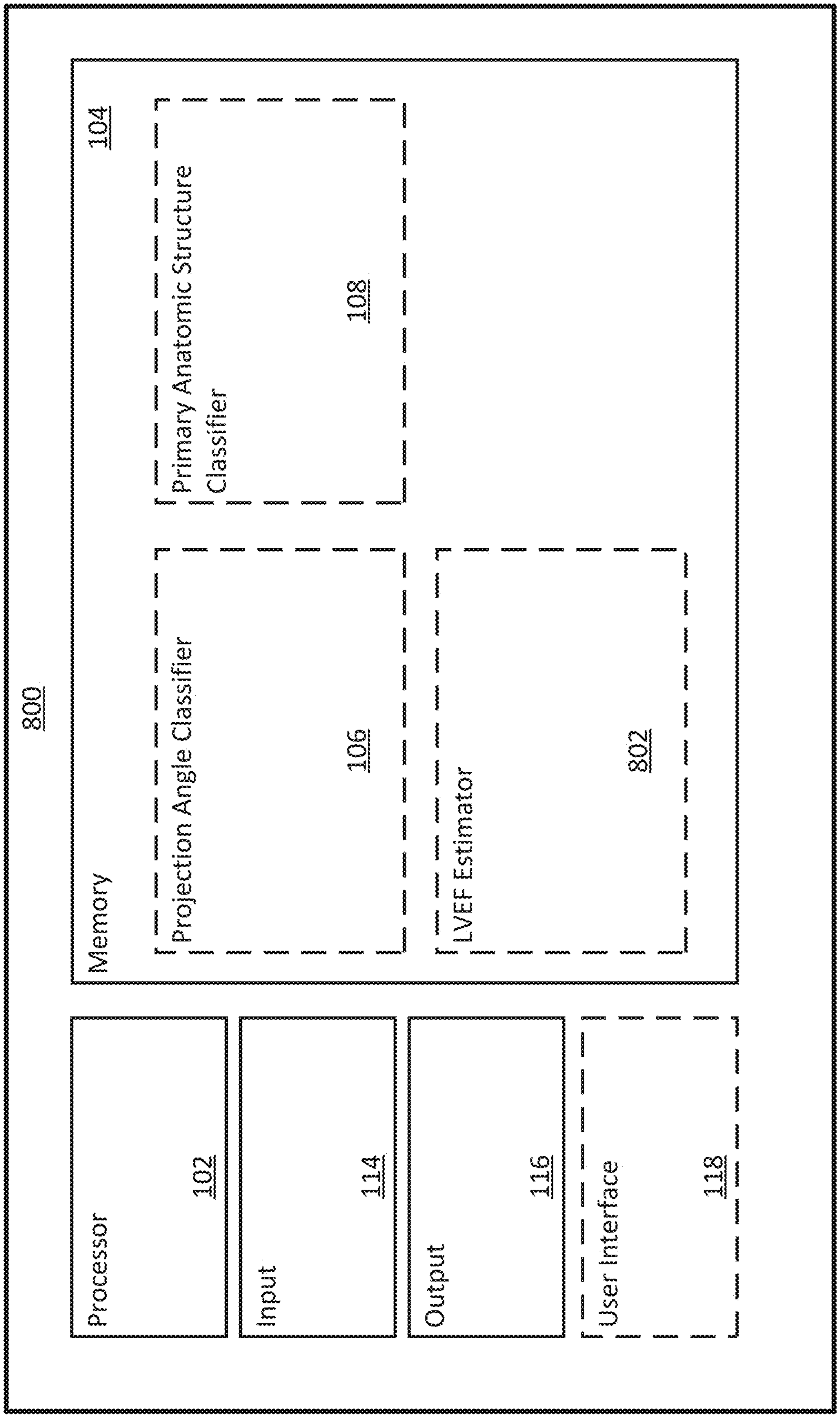
FIG. 8 illustrates a computer for performing automatic assessment of LVEF using a general coronary angiogram in accordance with an embodiment of the invention.

FIG. 8 illustrates a computer 800 for performing automatic assessment of LVEF using a general coronary angiogram in accordance with an embodiment of the invention. The computer 800 includes many identically labeled components to the computer 100 described in connection with FIG. 1. The description of these components is applicable to FIG. 8 and these descriptions will not be repeated in detail. The computer 800 further includes a LVEF estimator 802. The LVEF estimator 802 may estimate the LVEF of the one or more angiogram images of a patient using the trained machine learning model as described in connection with FIG. 7. The projection angle classifier 106 may be used to determine the projection angle of one or more angiogram images. The primary anatomic structure classifier 108 may be used to determine the primary anatomic structure of one or more angiogram images. In some embodiments, The LVEF estimator 802 may only utilize angiogram image of a certain projection angle and classified as left coronary artery to produce the training data and may be used to estimate the LVEF. Filtering the angiogram images utilized may provide a more accurate estimate of LVEF.

For every coronary angiography study, the Digital Imaging and Communication in Medicine (DICOM) files (the native file format of the radiologic exam) may be identified where the left coronary artery may be present using an algorithm. Then each DICOM file may be converted to a 512×512 pixels .MP4 Video file where all identifying information may be removed. For every TTE, the LVEF may be measured from an echocardiogram report. In some embodiments, the LVEF may be measured using the Simpson formula. If multiple TTEs are performed around the coronary angiography, only the TTE closest to the date of the angiogram may be used to determine the measured LVEF.

Patient data may be randomized and their respective videos in the Full Dataset divided into Training datasets, Validation datasets, and Testing datasets. The division of the Full Dataset may be Training dataset (70%), Validation dataset (10%) and Testing dataset (20%). In some embodiments, no patient may be in more than one group.

In some embodiments, the automatic assessment may classify a coronary angiogram video of the left coronary artery to low LVEF (defined as ≤40% on the TTE). The automatic assessment may be based on a X3D architecture. The X3D architecture may be a video neural network that expands a 2D Image classification architecture, along multiple network area, in space, time, width, and depth. The automatic assessment may preserve the temporal input resolution for all features throughout the network hierarchy, preserving all temporal frequencies in all features, which may be crucial for LVEF determination. The automatic assessment may be light weight and may be implemented on a mobile device or on current hardware powering different coronary angiogram hardware suites.

In some embodiments, the automatic assessment may begin by performing Algorithm 1 and Algorithm 2 to the dataset. Algorithm 1 (discussed above) may be used to classify the angiographic projection angle of the angiogram images. Algorithm 2 (discussed above) may be used to classify the primary anatomic structure within the angiogram images. After obtaining the primary anatomic structure of each angiogram image, the angiogram images may be sorted for images including a left coronary artery. These angiogram images may be used for automatic assessment of LVEF using an LVEF Algorithm. In some embodiments, the classified angiographic projection angle from Algorithm 1 may be used to select the commonly obtained views. For example, the classified angiographic projection angle may be used to select the three commonly-obtained views.

In some embodiments, model weights may be initialized. Angiogram images may be augmented by random flip (both horizontal and vertical), random contrast, gamma and brightness variations, random application of CLAHE (e.g. to improve contrast in images). The LVEF algorithm may be trained to minimize the binary cross entropy between the predicted LVEF category (low vs normal) and the actual LVEF category. In some embodiments, ADAM may be used as an optimizer with an initial learning rate of 0.001, momentum of 0.9, and batch size of 8, for 500 epochs. Training may be halted once the loss function stopped improving for a certain amount of consecutive epochs in the test dataset. Then, a grid-search may be performed. In addition, different model architectures and temporal convolutions may be used such as R3D and R2+1D, as well as a TimesFormer model.

In some embodiments, the LVEF extracted from the TTE report may be divided into two groups (≥50% and <50%). The 50% efficiency cutoff obtained during the TTE may be used to define a significant left ventricular dysfunction and carries therapeutic and prognosis implications. The LVEF Algorithm percentage outputs may be calibrated, by obtaining the threshold of the Softmax probability of low LVEF threshold maximizing the F1 score in the Validation Dataset, ensuring optimal sensitivity and specificity. Then, the ROC-AUC may be calculated in the Test dataset and the performance of the LVEF Algorithm may be described using the sensitivity, specificity and diagnostic odds-ratio, at the video level and exam-level. Confidence intervals for these performance metrics may be derived by bootstrapping 80% of the test data over 1000 iterations to obtain 5th and 95th percentile values. The performance of the algorithm may be presented stratified by the projection and by the age group.

In some examples, a total of 3679 patients and 4042 coronary angiogram exams with paired TTE may be identified in the study cohort for the presented analysis. After excluding very short angiogram videos or those with invalid metadata, a Full Dataset may be obtained including 3445 patients, 4042 coronary angiograms, and 36,566 videos of the left coronary artery. The videos may be split as follows: 17,982 in the training dataset, 2691 in the validation dataset, and 5414 in the hold-out test dataset. Patients in the Full Dataset may have an average age of 51.2±4.2 years. In some examples, in the LVEF group (595 patients), the ejection fraction may be 28.3±7.6% whereas in the normal LVEF group (2850 patients), the ejection fraction may be 61.0±9.3% (p<0.001).

In some examples, the model may finish training after 29 epochs and the train dataset AUC-ROC may be 0.962 whereas the loss may be 0.186. In the validation dataset, the AUC-ROC may be 0.817 (95% Cl:0.795-0.839) at the video-level. The cut-off separating low-LVEF from normal-LVEF that maximized the F1-score may be 0.90. In the Test dataset, an AUC-ROC of 0.851 (95% Cl: 0.839-0.863) may be observed at the video-level which increased to an AUC-ROC of 0.891 (95% Cl: 0.860-0.923) when averaging out predictions around left coronary artery videos performed during the same exam. In some embodiments, the sensitivity may be 0.83 whereas the specificity may be 0.77 at the exam-level. When looking at the coronary projections that performed best, the left anterior oblique (LAO) cranial, the right anterior oblique (RAO) cranial, the anteroposterior (AP) cranial and the LAO caudal views achieved the highest AUC at the video-level for discriminating between low-LVEF and normal-LVEF.

Example Embodiments

Although many embodiments of the invention have been described in detail, it should be appreciated that the invention may be implemented in many other forms without departing from the spirit or scope of the invention. For example, embodiments such as enumerated below are contemplated:

Item 1: A method for estimating left ventricular ejection fraction, the method comprising:

- producing one or more angiogram images of a patient and an estimate of left ventricular ejection fraction of the patient to produce training data;
- training a machine learning model with the training data;
- providing one or more angiogram images of another patient; and
- estimating the left ventricular ejection fraction of the one or more angiogram images of the other patient using the trained machine learning model.

Item 2: The method of Item 1, wherein the estimate of the left ventricular ejection fraction of the patient is produced by transthoracic echocardiogram (TTE) or left ventricular angiography.

Item 3: The method of Item 1, wherein the one or more angiogram images of the patient and the other patient are normal angiogram images without dye injected directly into the patient's aorta or ventricle.

Item 4: The method of Item 1, further comprising classifying a projection angle of the angiogram image, wherein only angiogram images of certain projection angles are used to produce the training data and are used to estimate the left ventricular ejection fraction.

Item 5: The method of claim 1, further comprising classifying a primary anatomic structure of the one or more angiogram images of the patient and the other patient, wherein only angiogram images classified as a left coronary artery are used to produce the training data and are used to estimate the left ventricular ejection fraction.

Item 6: A method for estimating arterial stenoses severity, the method comprising:

- classifying a primary anatomic structure of one or more angiogram images of a first patient;
- classifying a projection angle of the one or more angiogram images of the first patient;
- labeling stenoses within the one or more angiogram images of the first patient classified as including a left or right coronary artery;
- filtering out certain labels in the one or more angiogram images based on certain classified projection angles;
- producing one or more angiogram images of a second patient with corresponding estimated stenoses of the second patient to produce training data;
- training a machine learning model with the training data; and
- estimating the arterial stenoses severity of the first patient by running the machine learning model on the filtered and labeled one or more angiogram images of the first patient, wherein the machine learning model is only run on angiogram images previously labeled as including stenoses.

Item 7: The method of Item 6, wherein classifying the primary anatomic structure, classifying the projection angle, and labeling one or more relevant objects is performed using a machine learning technique.

Item 8: The method of Item 6, further comprising segmenting the coronary artery by classifying each individual pixel of the one or more angiogram images of the first patient as vessel containing pixels and non-vessel containing pixels and omitting non-vessel containing pixels before estimating the arterial stenoses severity of the first patient.

Item 9: The method of Item 6, further comprising cropping one or more angiogram images labeled to include stenoses to focus on the stenoses prior to estimating the arterial stenoses severity.

Item 10: The method of Item 9, wherein cropping one or more angiogram images comprises expanding a bounding box including the stenoses and resizing an aspect ratio of the bounding box to one of multiple aspect ratios depending on the different variation in a vessel orientation of the artery.

Item 11: The method of Item 10, wherein the multiple aspect ratios comprises three constant aspect ratios.

Item 12: The method of Item 6, wherein estimating the arterial stenoses severity of the first patient is performed on multiple angiogram images previously labeled as including stenoses.

Item 13: The method of Item 12, wherein the multiple angiogram images are consecutive frames of an angiogram.

Item 14: The method of Item 6, wherein primary anatomic structure of one or more angiogram includes a left coronary artery, a right coronary artery, bypass graft, catheter, pigtail catheter, left ventricle, aorta, radial artery, femoral artery, and/or pacemaker.

Item 15: The method of Item 6, further comprising labeling anatomic coronary artery segments and/or additional angiographically relevant objects within the one or more angiogram images.

Item 16: The method of Item 15, wherein the anatomic coronary artery segments includes a proximal right coronary artery (RCA), middle RCA, distal RCA, posterior descending artery, left main artery, proximal left anterior descending artery (LAD), middle LAD, distal LAD, proximal left circumflex (LCX), and/or distal LCX.

Item 17: The method of Item 15, wherein the additional angiographically relevant objects includes guidewires and/or sternal wires.

Item 18: A method of analyzing coronary angiograms, the method comprising: producing one or more coronary angiogram images with a corresponding estimated feature of the one or more coronary angiogram images to produce training data;

training a machine learning model with the training data; and running the machine learning model on another one or more coronary angiogram images to estimate features of the other one or more angiogram images.

Item 19: The method of Item 18, wherein the estimated feature comprises coronary stenoses.

Item 20: The method of Item 18, wherein the estimated feature comprises anatomic coronary artery segments and/or additional angiographically relevant objects.

Item 21: The method of Item 20, wherein the additional angiographically relevant objects includes guidewires and/or sternal wires.

DOCTRINE OF EQUIVALENTS

While the above description contains many specific embodiments of the invention, these should not be construed as limitations on the scope of the invention, but rather as an example of one embodiment thereof. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for estimating arterial stenoses severity, the method comprising:

classifying a primary anatomic structure of one or more angiogram images of a first patient;

classifying a projection angle of the one or more angiogram images of the first patient;

labeling stenoses within the one or more angiogram images of the first patient classified as including a left or right coronary artery;

filtering out certain labels in the one or more angiogram images based on certain classified projection angles;

producing one or more angiogram images of a second patient with corresponding estimated stenoses of the second patient to produce training data;

cropping the one or more angiogram images labeled to include stenoses to focus on the stenoses;

training a machine learning model with the training data; and estimating the arterial stenoses severity of the first patient by running the machine learning model on the filtered and labeled one or more angiogram images of the first patient, wherein the machine learning model is only run on angiogram images previously labeled as including stenoses.

2. The method of claim 1, wherein classifying the primary anatomic structure, classifying the projection angle, and labeling one or more relevant objects is performed using a machine learning technique.

3. The method of claim 1, further comprising segmenting the coronary artery by classifying each individual pixel of the one or more angiogram images of the first patient as vessel containing pixels and non-vessel containing pixels and omitting non-vessel containing pixels before estimating the arterial stenoses severity of the first patient.

4. The method of claim 1, wherein cropping one or more angiogram images comprises expanding a bounding box including the stenoses and resizing an aspect ratio of the bounding box to one of multiple aspect ratios depending on the different variation in a vessel orientation of the artery.

5. The method of claim 4, wherein the multiple aspect ratios comprises three constant aspect ratios.

6. The method of claim 1, wherein estimating the arterial stenoses severity of the first patient is performed on multiple angiogram images previously labeled as including stenoses.

7. The method of claim 6, wherein the multiple angiogram images are consecutive frames of an angiogram.

8. The method of claim 1, wherein primary anatomic structure of one or more angiogram includes at least one of a left coronary artery, a right coronary artery, bypass graft, catheter, pigtail catheter, left ventricle, aorta, radial artery, femoral artery, and pacemaker.

9. The method of claim 1, further comprising at least one of labeling anatomic coronary artery segments and additional angiographically relevant objects within the one or more angiogram images.

10. The method of claim 9, wherein the anatomic coronary artery segments includes at least one of a proximal right coronary artery (RCA), middle RCA, distal RCA, posterior descending artery, left main artery, proximal left anterior descending artery (LAD), middle LAD, distal LAD, proximal left circumflex (LCX), and distal LCX.

11. The method of claim 9, wherein the additional angiographically relevant objects includes at least one of guidewires and sternal wires.

12. A system of analyzing coronary angiograms comprising:

a processor configured to perform a method of analyzing coronary angiograms, the method comprising:

producing one or more coronary angiogram images with a corresponding estimated feature of the one or more coronary angiogram images to produce training data;

cropping the one or more angiogram images labeled to include stenoses to focus on the stenoses;

training a machine learning model with the training data; and running the machine learning model on another one or more coronary angiogram images to estimate features of the other one or more angiogram images.

13. The method of claim 12, wherein the estimated feature comprises coronary stenoses.

14. The method of claim 12, wherein the estimated feature comprises at least one of anatomic coronary artery segments and additional angiographically relevant objects.

15. The method of claim 14, wherein the additional angiographically relevant objects includes at least one of guidewires and sternal wires.

* * * * *